(12) United States Patent
Habisreitinger et al.

(10) Patent No.: US 7,459,051 B2
(45) Date of Patent: Dec. 2, 2008

(54) METHOD AND APPARATUS FOR AUTOMATED APPLICATION OF LACQUERED FILMS TO BODY PARTS, AND AUTOMATION-COMPATIBLE LACQUERED FILM COMPOSITE

(75) Inventors: Uwe Habisreitinger, Lossburg (DE); Bernhard Nordmann, Boeblingen (DE)

(73) Assignee: Daimler AG, Stuttgart (DE)

( * ) Notice: Subject to any disclaimer, the term of this patent is extended or adjusted under 35 U.S.C. 154(b) by 562 days.

(21) Appl. No.: 10/520,164

(22) PCT Filed: May 16, 2003

(86) PCT No.: PCT/EP03/05154

§ 371 (c)(1),
(2), (4) Date: Sep. 8, 2005

(87) PCT Pub. No.: WO2004/005012

PCT Pub. Date: Jan. 15, 2004

(65) Prior Publication Data

US 2006/0151085 A1  Jul. 13, 2006

(30) Foreign Application Priority Data

Jul. 4, 2002 (DE) ................................ 102 30 034

(51) Int. Cl.
  *B44C 1/165* (2006.01)
  *B44C 1/17* (2006.01)
  *B29C 65/48* (2006.01)
  *B32B 37/10* (2006.01)
  *B32B 37/12* (2006.01)
  *B32B 37/26* (2006.01)

(52) U.S. Cl. ........................ 156/230; 156/231; 156/232; 156/233; 156/234; 156/247; 156/344

(58) Field of Classification Search ......... 156/230–235, 156/237–241, 229, 247, 249, 251, 252, 344, 156/540, 584
See application file for complete search history.

(56) References Cited

U.S. PATENT DOCUMENTS 3,629,034 A * 12/1971 Kuroda ...................... 156/219
4,197,151 A * 4/1980 Muzik ........................ 156/249
5,676,789 A * 10/1997 Hamamura .................. 156/344

(Continued)

FOREIGN PATENT DOCUMENTS

DE  195 32 998 A  3/1997

(Continued)

OTHER PUBLICATIONS

German Office Action dated Mar. 3, 2006 (Two (2) pages).

*Primary Examiner*—Mark A. Osele
*Assistant Examiner*—Sing P Chan
(74) *Attorney, Agent, or Firm*—Crowell & Moring LLP

(57) ABSTRACT

A method and an apparatus for automated application of paint film to bodywork parts (1) and to a paint film composite (5) which is suitable for automation. A paint film composite (5) which is suitable for automation is created and adhesively bonded onto the bodywork part (1) in an accurate position and without any bubbles or creases by means of a robot-controlled application tool that is appropriate for this purpose. To securely hold the film composite (5), which has been picked up from a substrate, the suction grippers (30, 31) which grip the ends are angled in mirror-image form, in order in this way to prevent the ends from becoming detached from the suction grippers. The lower protective strip (9) is then at least partially pulled off, thus exposing the adhesive face of the useful part (6) of the paint film. The film composite (5) is aligned in the correct orientation at a short distance from the bodywork part (1) and the useful part (6) of the paint film is wiped onto the bodywork surface (1).

16 Claims, 9 Drawing Sheets

U.S. PATENT DOCUMENTS

| | | | |
|---|---|---|---|
| 6,699,346 B1 * | 3/2004 | Habisreitinger et al. | 156/229 |
| 2001/0035258 A1 | 11/2001 | Justin | |
| 2003/0183327 A1 * | 10/2003 | Titze | 156/212 |

FOREIGN PATENT DOCUMENTS

| | | |
|---|---|---|
| DE | 196 42 831 A | 4/1998 |
| DE | 198 09 515 A | 9/1999 |
| DE | 100 13 224 A1 | 9/2001 |
| EP | 0 635 864 A | 1/1995 |
| JP | 11 011408 A | 1/1999 |
| WO | WO 01 05902 A | 1/2001 |
| WO | WO 01/59902 A1 | 8/2001 |

* cited by examiner

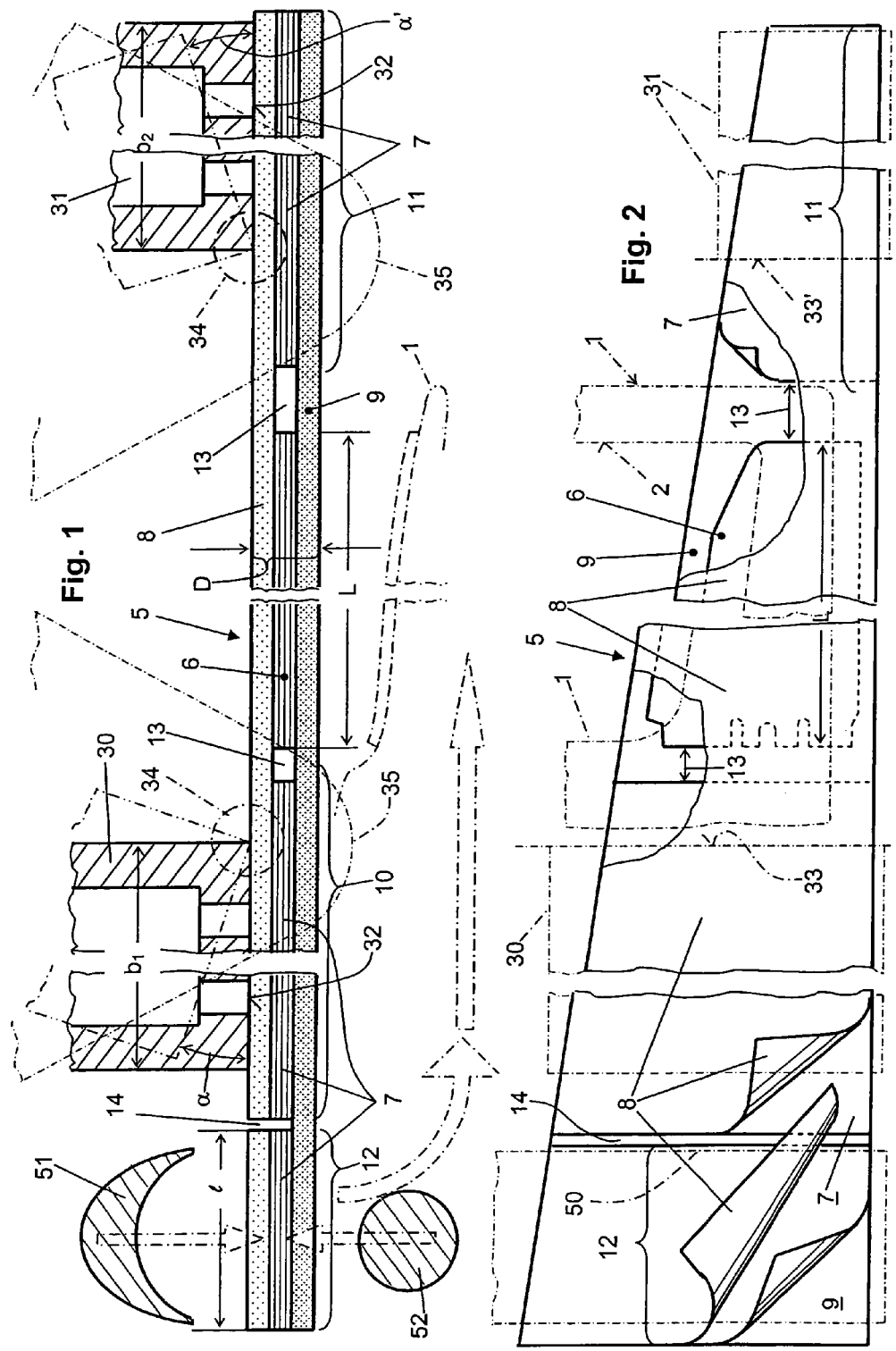

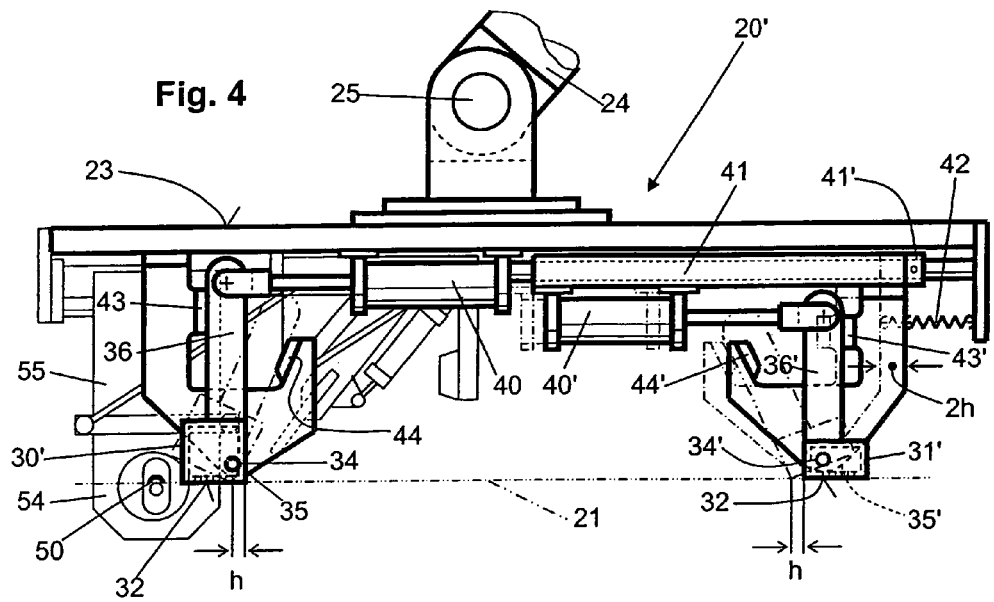
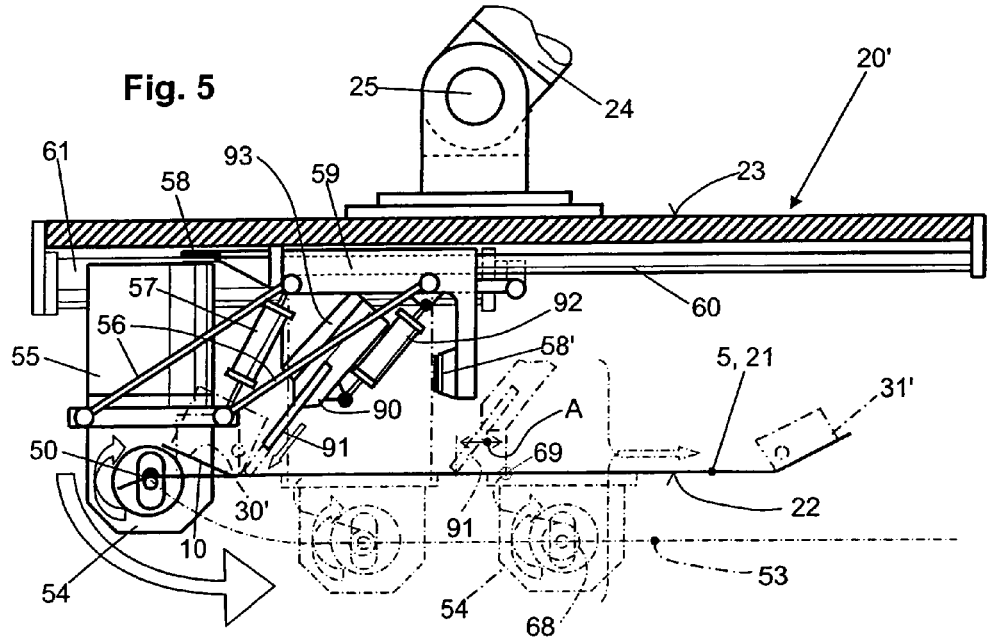

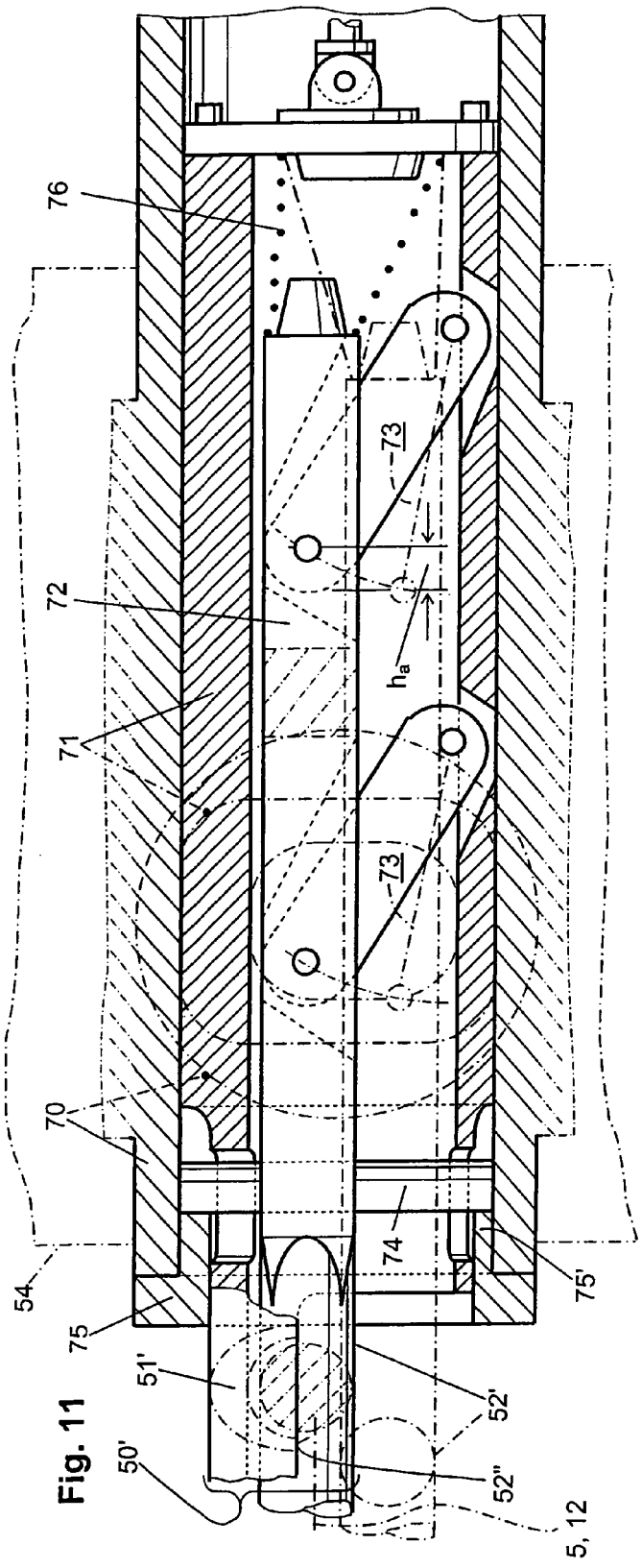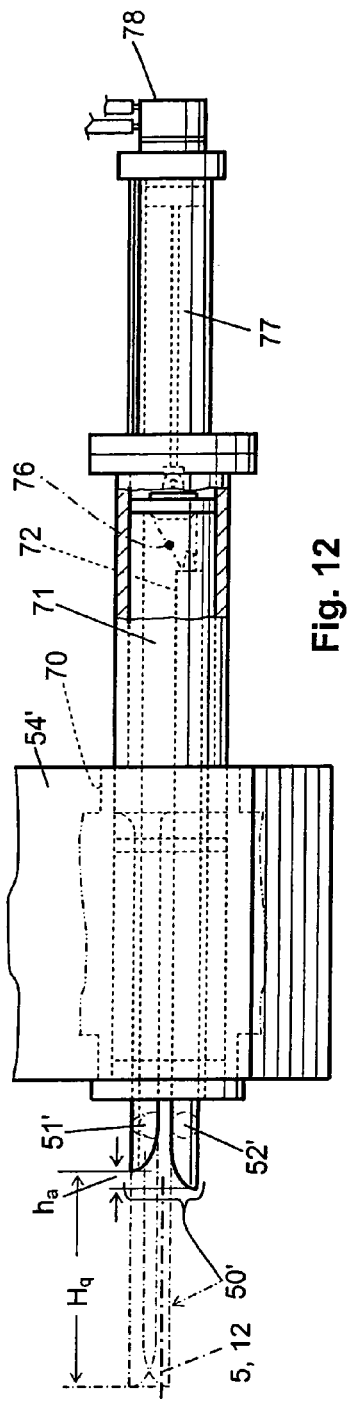

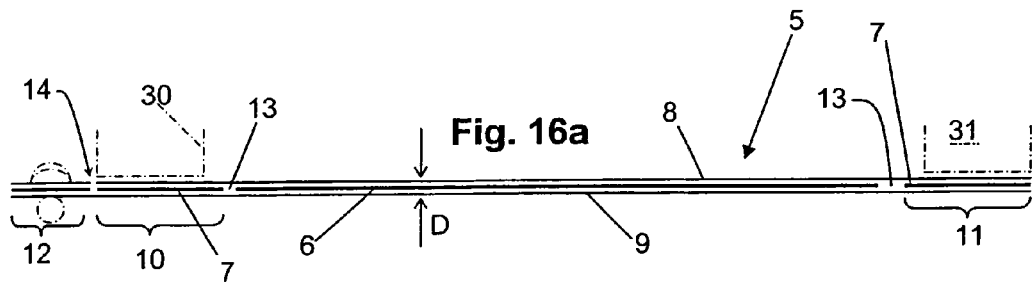
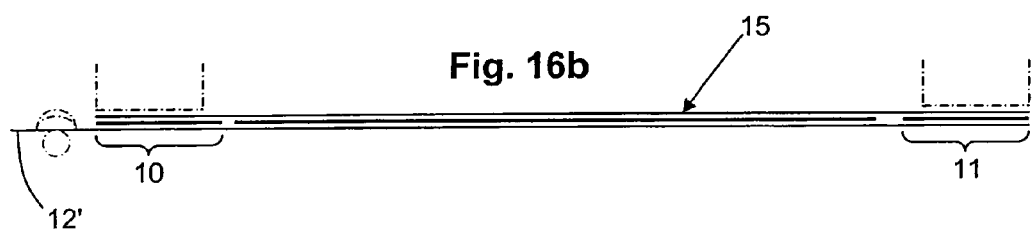
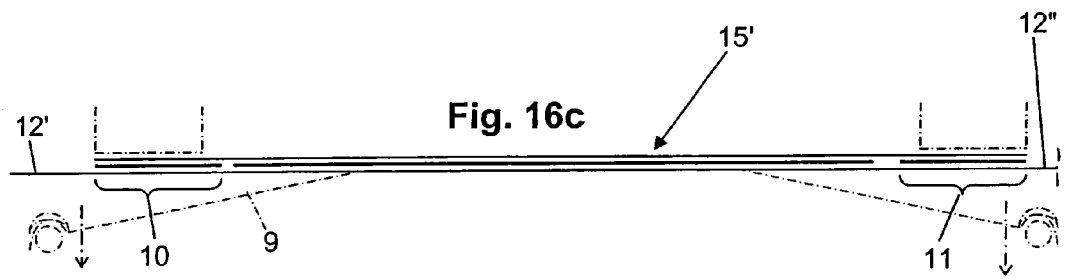
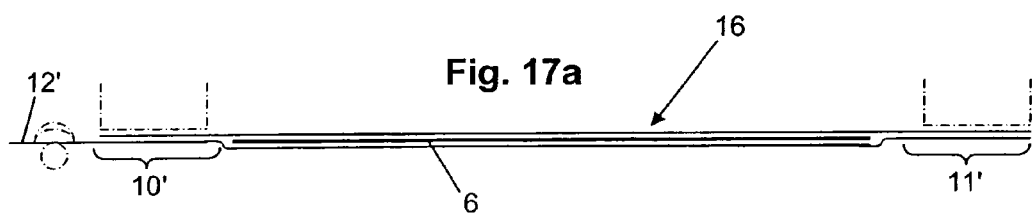
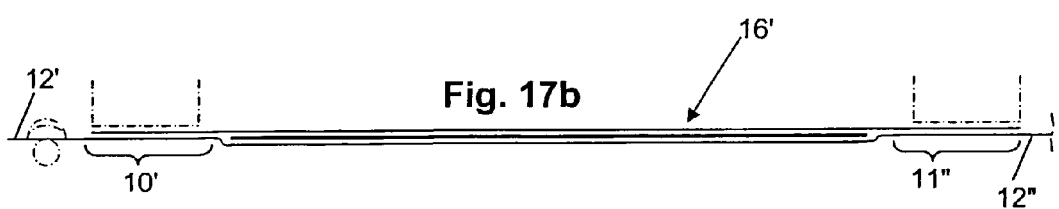

METHOD AND APPARATUS FOR AUTOMATED APPLICATION OF LACQUERED FILMS TO BODY PARTS, AND AUTOMATION-COMPATIBLE LACQUERED FILM COMPOSITE

The application claims the priority of German Patent Document No. 102 30 034.8, filed 4 Jul. 2002 and PCT/EP2003/005154, filed 16 May 2003 the disclosure of which is expressly incorporated by reference herein, respectively.

BACKGROUND AND SUMMARY OF THE INVENTION

The invention relates to a method and an apparatus for automated application of paint film to bodywork parts and to a paint film composite which is suitable for automation. In this case, the invention is based on a method for automated application of self-adhesive film to bodywork parts. German reference DE 196 42 831 A1 and DE 198 09 515 A1 are examples of prior art methods of such application to body parts. With regard to the paint film composite, reference should be made as the known generic type to DE 195 32 998 A1.

In the case of vehicles, the bodywork surface which is located between two adjacent glass surfaces is frequently intended, for stylistic reasons, to have a high-gloss paint film, which is colored black irrespective of the color of the rest of the vehicle, bonded over it, in order to give the impression of a continuous glass surface at this point. To be precise, this relates in particular to the two adjacent vertical frame struts of the window frames in the area of the center pillar of the vehicle. At least one of these frame struts is arranged on the window frame of a side door. Since these bodywork surfaces are generally only in the form of narrow strips, the blank of the paint film to be applied also has a correspondingly elongated form and is not particularly large, so that the corresponding paint film blank can be handled manually by just one person without any problems. Since, on the other hand, the paint film remains on the vehicle throughout its entire useful life, the paint film must be appropriately and permanently adhesively bonded to the bodywork. In this case, it should be remembered that the side struts to be adhesively bonded over in this way are located in the direct field of view of the vehicle users, at least on entering the vehicle, and the requirements for perfect film application are thus particularly stringent.

German reference DE 195 32 998 A1 discloses a flat blank for a self-adhesive paint film, which is intended to be applied without any bubbles or creases to the frame strut of a window frame. In order to avoid trapped air enclosures (bubbles) between the bodywork and the paint film, the latter is provided, at least in areas which are at risk, over the entire surface area with a large number of microscopic venting openings which are arranged in the form of a grid. Any air enclosures can escape without any problems through these venting openings. Because the venting openings are so small they do not interfere—at least initially—with the external appearance of the bodywork part to which the paint film has been applied. The venting openings arranged in the form of a grid are also intended to increase the spatial adaptation capability of the paint film, and to reduce the risk of creases being formed. This document admittedly says nothing about the way in which the film is applied—manually or in an automated form, but the overall impression of this document leads to the supposition that the paint film can be applied only manually. Furthermore, this document does not disclose the complete structure of the film composite, which includes the paint film blank ready for processing, in the delivery state. In general, it should be noted as a critical factor of this prior art that the large number of microscopic venting openings will in fact become visible over the course of time owing to weather influences and aging processes, so that the paint film will become unattractive.

It can be assumed that the paint film blank which is provided with a highly intensively adhesive adhesion bonding layer on its lower face represents a film composite having a total of three layers in the delivery state in which it is ready for processing, in which a protective film or a protective paper is in each case adhesively bonded both over the lower face and on the high-gloss visible face of the paint film blank. In this case, the protective paper on the lower face is provided on the contact face with the adhesive bonding layer of the paint film blank with an antistick coating, so that it can be detached from the intensively adhesive bonding layer of the paint film relatively easily, and in particular without tearing into the paint film. The protective paper on the upper face is provided on the contact face with the outside of the paint film blank with an only slightly adhesive bonding layer, so that this protective paper can also easily be detached from the paint film.

When paint films are being applied manually, the protective film strips on the lower face or adhesive face are removed completely, so that the adhesive face of the paint film is exposed. The protective film strip which still adheres to the visible face of the paint film is set back with respect to the end of the paint film according to the description in the above-mentioned German reference DE 195 32 998 A1, so that the remaining film composite has to be handled on the paint film blank itself. For application, the paint film—guided manually at both of its ends—is aligned by eye in the stretched state a short distance above the bodywork part to be bonded over, and one end of the paint film is pressed against the bodywork, in the correct position. One important factor in this case is that the boundary edges of the paint film blank are not covered by any outer protective paper in the end area. While manually maintaining the tensile stress in the paint film which has been firmly adhesively bonded at one end, it is pressed against the bodywork from the end which has been firmly adhesively bonded towards the other end along a progressing pressure line using the hand which has become free. This contact pressure is repeated with an increased linear force by means of a flexible wiper, preferably in the form of a hard piece of felt, in order to improve the adhesion. Once the outer protective strip has been pulled off, those edges of the paint film which project beyond the frame strut at the side are then bent around the edges of the bodywork part, and are likewise pressed on the rear face.

Manual application of paint films to the vehicle bodywork has various disadvantages. On the one hand, the paint films can be positioned with only little accuracy, leading to frequent reworking. In this case, it should be remembered that there is no exact reference mark on the bodywork for alignment of the film blank by eye. If the alignment is not correct, the paint film may either be seated at a slight angle, so that the edges, whose dimensions are short, run poorly, or the film blank is seated too high or too low. When applied to the two window frame struts which are immediately adjacent to one another in the area of the center pillar, a different height position of the paint films may in some circumstances be highly disturbing. A further disadvantage is that, even if the paint film runs smoothly on the bodywork and a large contact pressure is applied to the paint film to press it onto the frame strut, air enclosures frequently occur between the two items, although these are frequently not evident until after a certain delay. The air which is adsorbed on the adhesive layer is initially included in the form of microscopic and inconspicuous small bubbles. This primary air slowly migrates within the adhesive layer and gathers to form larger small bubbles, which produce local bulges in the paint film. These small bubbles which appear only retrospectively must be rectified by reworking, that is to say by deliberately puncturing them with needles. It has also been found that the complete removal of the lower protective film strip, that is to say the exposure of the adhesive face of the paint film, leads to dust particles accumulating on this adhesive layer which, in some circumstances, may be evident in an unpleasant manner on the visible face of the applied paint film. The process of pulling off the protective film strip creates a certain electrostatic potential, which attracts dust particles and bonds them to the adhesive layer. Particles deposited between the paint film and the bodywork can be rectified only by tediously removing the applied paint film during a reworking step and, in some circumstances, applying a new paint film after the bodywork has been cleaned. The reworking (which has many causes) in the case of manual application of paint film has an adverse effect on productivity, and considerably increases the production costs. In addition to all that has been stated, it should be noted that manual application of paint film is monotonous but nevertheless requires a high degree of care, and that powerfully manually pressing the paint film in place is not only very tiring but, if such stress is long-lasting, can also lead to adverse health effects, for example to inflammation of tendons and their sheaths, or to joint pains.

As a result of all these difficulties, efforts are also already being made to change to providing the stylistic function of the paint film, specifically on the central frame struts of the side windows, to give the impression of a continuous glass surface by means of a hard plastic part covered with a high gloss black-colored paint, which is clipped and/or screwed to the frame strut at the appropriate point. Apart from the fact that a hard plastic part such as this, including the fitting means, is considerably more expensive than a paint film blank, this also restricts the internal area by the physical height of the hard plastic part, for predetermined external vehicle dimensions. Apart from this, a hard plastic part such as this and the fitting means are also heavier than a paint film blank.

German reference DE 196 42 831 A1 discloses an apparatus and a method for application during series production of self-adhesive protective film to vehicle bodyworks. The protective film is used as transport packaging for brand-new vehicles while the vehicle is being transported from the factory to the vehicle dealer. The protective film is pulled off the bodywork again before the vehicle is handed over to the customer. Since the protective film is used only temporarily, its adhesion capability is only relatively low. It should be possible to pull it off the bodywork again easily after use, in particular without tearing into it or leaving behind any residues on the bodywork. The film need adhere only sufficiently firmly to ensure that it cannot become detached from the bodywork on its own as a result of the wind of motion and/or weather influences during transportation. The bodywork parts to be protected include, in particular, the large-area horizontal surfaces, that is to say the roof, the engine hood and the trunk lid. The driver's door is also bonded over, for protection reasons.

According to German reference DE 196 42 831 A1, the protective film is provided as a virtually endless material web on a supply roll for application, with the adhesive face of the outer layer within the film coil lying directly on the outer face of the film layer adjacent to it on the inside, that is to say being bonded to it—corresponding to the low adhesion capability of the protective film. A reasonable, rectangular piece is pulled off the supply roll and is cut to length for application of the protective film, with two opposite longitudinal sides of the film blank each being held firmly by a robot-controlled holding strip in the form of a respective suction strip, holding the film blank in the stretched-out state. If required, specific parts, for example for fittings, can be cut out of the film blank in this stretched-out state. The film blank is then aligned above the bodywork part over which it is to be bonded, by means of the handling robot, and is applied to the appropriate bodywork part with the film blank being moved towards the vehicle surface. Since the bodywork parts to be bonded over are slightly curved, a relatively small contact zone, located approximately centrally, results first of all as the film blank is moved closer to the bodywork component and its size becomes larger as the film blank is moved closer until, finally, the entire horizontal surface is bonded over virtually without any bubbles or creases. The already applied protective film is then pushed on along a progressive pressure line, by means of a weighted felt wiper which corresponds to the shape.

The known application technique for the only slightly adhesive, large-area protective films, which are provided in the form of wound-up, virtually endless, single-layer material webs, cannot be transferred to the application of small-area paint film blanks which are provided in an individually prefabricated form, in each case as a three-layer film composite. Apart from this, the requirements for position accuracy, freedom from bubbles and creases in the applied paint film are considerably more stringent than in the case of protective films.

An object of the invention is to improve the method which forms the generic type and the corresponding apparatus such that paint film blanks can be applied to sought-out bodywork areas in an automated form, such that reworking can very largely be avoided, despite the quality requirements being much more stringent than those for protective films. Furthermore, the invention is intended to provide a paint film composite which is suitable for automation and by means of which the application of the paint film can be carried out in an automated manner.

According to the present invention, a paint film composite, which is suitable for automation, is first of all created and is adhesively bonded onto the bodywork part in an accurate position, and without any bubbles or creases, by means of a robot-controlled application tool that is suitable for this purpose. In order to securely hold the film composite which has been picked up from a table or the like, the two suction grippers which grip the ends are angled in mirror-image form, in order in this way to prevent the ends from becoming detached from the suction grippers. The lower protective strip, which is gripped by a moving gripping tool on a pulling-off lug which projects at the end, is at least partially pulled off, thus exposing the adhesive face of the useful part of the paint film. The film composite, which is held stretched out, is aligned in the correct orientation at a short distance away from the bodywork part which is to be bonded to and is held inflexibly, and the useful part of the paint film is wiped onto the bodywork surface by a moving wiper, from its separated position. The outer protective strip, which is still held firmly by the suction gripper, is then pulled off the applied paint film. Expedient refinements of the invention can be found in the respective dependent claims.

BRIEF DESCRIPTION OF THE DRAWINGS

The invention will be explained in the following text with reference to various exemplary embodiments, which are illustrated in the attached drawings, in which:

FIGS. 1 and 2 show a longitudinal section (FIG. 1) and a plan view (FIG. 2) through and respectively of a film composite which is suitable for automation and has a paint film blank to be applied, with the directly involved components of the application tool as shown in FIG. 3 and of the bodywork likewise also being illustrated, FIG. 4 shows the same side view as that in FIG. 3 of a modified application tool, with the pivoting bearing being formed by recessed journal bearings, but with a constant stress on the picked-up film composite being ensured by the angling of the suction grippers by virtue of a movable bearing for the end suction gripper, FIG. 5 shows a vertical section through the application tool shown in FIG. 4 parallel to the view shown in this figure, showing the device for pulling off the outer protective strip, FIGS. 11 and 12 show a greatly enlarged section illustration (FIG. 11) and a view (FIG. 12) on a smaller scale of another embodiment of long-nose pliers, which have a jaw lower part which can be moved parallel, and can be moved backward and forward as an entity by the width of the film composite.

DETAILED DESCRIPTION OF THE DRAWINGS

Figure 3:
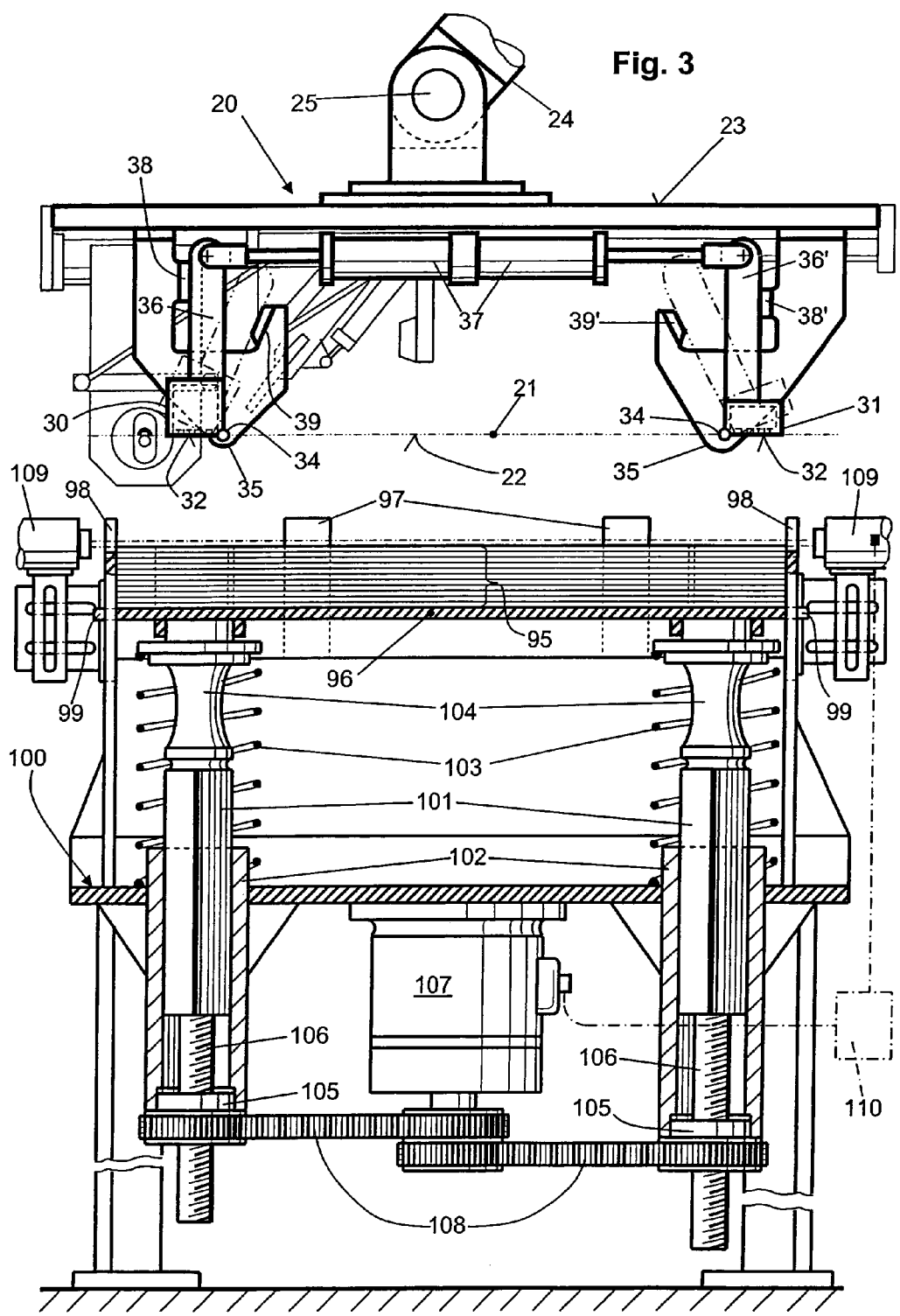
FIG. 3 shows a side view of a robot-controlled application tool when moving towards a stacking apparatus, which is likewise illustrated and in which a specific supply of film composites to be applied is held in the correct position, with the pivoting bearing for the suction grippers of the application tool being arranged concentrically with respect to each of the mutually facing edges.

The method according to the invention for automated application of self-adhesive paint film to bodywork parts is dependent on the paint film to be applied being prefabricated in the form of blanks 6, which are produced in a suitable form for robots. The bodywork part to be covered with paint film may, for example, be a vertical limb, which is located in the area of the center pillar of a vehicle, of a window frame in a side door, whose outer surface requires the film blank to have an elongated shape. A bodywork part 1 such as this is indicated by dashed-dotted lines in FIGS. 1 and 2 and by solid lines in FIGS. 6, 7 and 8. In order to apply it, a film blank is gripped on the non-adhesive outer face at two opposite ends by means of suction grippers to which a vacuum can be applied, is held stretched out, is aligned accurately in position above the bodywork part to be bonded onto in this state, and is adhesively bonded to it.

In order to allow the prefabricated paint film blanks 6 to be transported and to be handled in an automated manner, they must each be provided on the outside and underneath with an adherent but easily detachable protective strip 8, 9, that is to say must be included in a film composite, with the drawings showing different embodiments of the film composites 5 (FIGS. 1, 2, 6 and 16a), 15 (FIG. 16b), 15' (FIG. 16c), 16 (FIG. 17a), 16' (FIG. 17b). These variants will be described in more detail further below, although the description will first of all be continued on the basis of the exemplary embodiment shown in FIGS. 1, 2 and 16a. It is important for correct handling and application of the paint film blank that each of the two protective strips 8, 9 project beyond the useful length L of the blank at the two ends, which are located in the area of the narrow faces of the blank, where they form projections 10 and 11, respectively, on which the film composite can be held firmly by means of suction grippers 30 and 31, respectively, to which a vacuum can be applied, without having to cover the area of the paint film blank 6 itself.

The length, measured in the longitudinal direction of the blank 6, of the end projection 11 is approximately matched to the attachment width $b_2$ of the associated end suction gripper 31 measured in the longitudinal direction of the paint film blank 6. The length of the other, start-side projection 10 is admittedly likewise approximately matched to the attachment width $b_1$ of the associated start-side suction gripper 30. However, the start-side projection 10 is lengthened, at least with respect to the lower protective strip 9, by a specific gripping length l beyond the application width $b_1$ which has been mentioned, so that a pulling-off lug 12 is also formed by this gripping length l.

The film composite 5 which is designed in this way and contains the paint film blank 6 is offered to be picked up by the application tool in a defined orientation with the outer protective strip 8 freely accessible in the working area of a freely programmable industrial robot, which is provided with an application tool 20. This offering of the film composite in a defined orientation for transfer by the handling robot can be carried out in various ways as well as in different orientations. The important factor in this case is that, firstly, the position, which is defined precisely by mechanical stops or the like, of the film composite to be transferred does not change during the transfer process, that is to say it must be offered on a fixed substrate. On the other hand, the film composite must not rest on a rigid substrate. This could lead to permanent pressure points on the paint film to be applied in the event of minor orientation discrepancies, which can never be avoided completely, between the substrate and the picking-up plane 21 of the suction grippers 30, 31 in the application tool 20. This point will be discussed in more detail further below in conjunction with FIG. 3. At this point, it should just be noted that the film composites 5 are preferably offered to the application tool for transfer stacked in a horizontal position. In order to allow the film composites to be stacked as far as into the projections, and to lie flat in the stack, a supporting film 7, which corresponds to the thickness of the paint film 6, is in each case inserted between the two protective strips 8, 9 in the area of the projections 10 and 11, so that the film composite 5 is formed with three layers over its entire length—apart from certain interruptions—and has a uniform thickness D. The thickness of the individual layers of the film composite is illustrated in an exaggerated form in order to illustrate this more clearly in FIG. 1.

Two suction grippers 30, 31 are provided on the working face 22 of the application tool 20, and their sucking picking-up surfaces 32 are located on a standard picking-up plane 21. Their positions and sizes correspond to the projections 10 and 11 which have been mentioned on the film composite 5. In a corresponding manner to the start-side and end projections, the suction grippers will be referred to as the "start-side suction gripper" 30 and the "end suction gripper" 31. The two suction grippers can be fitted with their sucking picking-up surfaces to the upper protective strip 8 in the area of the two projections 10, 11, with the vacuum then being applied, so that the film composite to be picked up is transferred from the offered position to the application tool.

While the film composite 5 is being handled during the application process, there is a risk of the film composite being raised by the sucking picking-up surfaces 32 of the suction grippers—starting from the boundary edge 33 or 33' which in each case faces the paint film blank—with air incorrectly being blown into the interior of the suction grippers so that air is at least partially introduced into the suction gripper or grippers. This would very greatly reduce the fixing force of the suction grippers, or would even cancel it out completely. In order to prevent this, the two suction grippers 30, 31 are each pivoted through a specific angle α, α', respectively, from the picking-up plane 21 after the transfer of the film composite 5. The projections 10, 11 on the film composite 5 which has been picked up and is held stretched out then project obliquely and approximately in mirror-image form with respect to one another from the picking-up plane 21 in the direction of the rear face 23 of the application tool, as is indicated by dashed-dotted lines in the figures. However, suitable design precautions must be taken with the suction grippers 30 and 31 and with their pivoting bearing to ensure that the tensile stress in the film composite is changed no more than negligibly by the pivoting movement. This will be discussed in more detail further below in conjunction with the description of the individual alternatives of the application tool 20, 20' and 20". At this point, it will just be mentioned that the magnitude of the pivoting angle α, α' of the suction grippers 30, 31 is greater than the largest angle β which occurs during the application process between the film composite 5 on the one hand and the connecting line between the two boundary edges 33, 33', which are located on the picking-up plane 21, of the opposite suction grippers on the other hand (see FIG. 6). With regard to the absolute magnitude of the pivoting angles α, α' of the suction grippers, a pivoting angle in the range from 10 to 60°, preferably 15 to 45° can be recommended in this context.

As preparation for the application of the paint film, the lower protective strip 9 is pulled off the paint film blank, initially using the pulling-off lug 12 on the start-side projection 10 for this purpose. This pulling-off lug is gripped by a gripping tool 50, which can move within the application tool, and the lower protective strip 9 is thus pulled off the film composite, starting at the start-side projection 10 in the exemplary embodiment illustrated in FIGS. 1, 2, 6 and 16a, with the entire adhesive face of the paint film blank 6 progressively being exposed.

In conjunction with the process of pulling the lower protective strip 9 off the film composite, it is on the one hand possible to pull this protective strip 9 completely off the film composite before the application process and only then to start the process of application of the paint film, for which there are once again different options, which are described further below in conjunction with the description relating to FIGS. 16b, 16c and 17a, 17b. Bearing in mind the risk of an electrostatic potential being produced in the remaining film composite as a result of the lower protective strip being pulled off, which can attract particles from the surrounding area to the exposed adhesive face of the paint film 6, where they can become firmly attached, it is advisable to keep the time interval between pulling the protective strip 9 off and adhesive bonding of the paint film 6 to the bodywork part 1 as short as possible, and to change the position of the remaining film composite as little as possible during this period. This aim is best achieved by not pulling off the lower protective strip until during the application process, that is to say simultaneously with the application. If the paint film 6 is adhesively bonded onto the bodywork part 1 immediately after the protective strip 9 has been pulled off, then the paint film application process can be carried out in the normal factory environment—instead of in the clean room conditions which would otherwise possibly be required.

Once the lower protective strip has been at least partially pulled off the film composite 5, which is held stretched out in the application tool 20, the film composite 5 is aligned in the correct orientation with the paint film blank 6 at a short distance from the bodywork part 1 which is to be bonded to and is held firmly in the defined orientation and inflexibly. The paint film blank 6 is then wiped onto the bodywork part 1 to be bonded to from the stretched-out separated position by means of a flexible wiper 90, 91 which can move longitudinally within the application tool 20. Finally, the upper protective strip 8 is pulled off the outer face of the completely applied paint film blank 6 by means of a pulling-off movement of the application tool 20, in particular of the end suction gripper 31. For this purpose, the application tool 20 is pivoted away from the bodywork surface 1 about a virtual pivoting axis which is located in the vicinity of the start-side suction gripper 30, as is indicated by the arrow shown by solid lines in FIG. 8. Instead of or in addition to this, the application tool 20 can be moved in the direction of the start-side end of the paint film blank 6. One and/or the other of these movements of the application tool results in the end suction gripper 31 pulling the outer protective strip 8 off the paint film blank 6, which has been completely applied to the bodywork part 1.

In order to pull the lower protective strip 9 off simultaneously with the application process in an advantageous manner, during the application process, the lower protective strip 9 is first of all only partially pulled off the film composite, and the adhesive face of the paint film blank 6 is only partially exposed. The rest of the process of pulling the protective strip 9 off and the exposure of the adhesive face of the paint film blank 6 then take place corresponding to the progress of the process of wiping the paint film blank 6 onto the bodywork part. In this case, the paint film blank 6 is wiped onto the bodywork part 1 in only a single direction and with only one wiper 90, 91.

During this process of pulling the lower protective strip 9 off simultaneously with the application process, an approximately constant distance A (see FIG. 5 or 6) is maintained between the progressing pulling-off point 69 on the protective strip that is to be pulled off, on the one hand, and the wiper 90, 91, which is following it and is likewise progressing, on the other hand. In order to make it possible to carry this out using a simple and physically compact application tool, the process of pulling off the lower protective strip 9 is carried out by the superimposition of a translational linear movement of a winding device on the one hand and the rotational winding movement of the winding device on the other hand. The winding device, which winds up the protective strip 9 that has been pulled off, is moved further translationally during the winding process at a speed which matches the speed of the wiper. Furthermore, the protective strip 9 is pulled off by means of the winding process—in its own right—at a speed which corresponds to the circumferential speed of the coil, which must be set such that it matches the speed of the wiper 90, 91. The translation speed and the winding speed are in this case superimposed.

Figure 7:
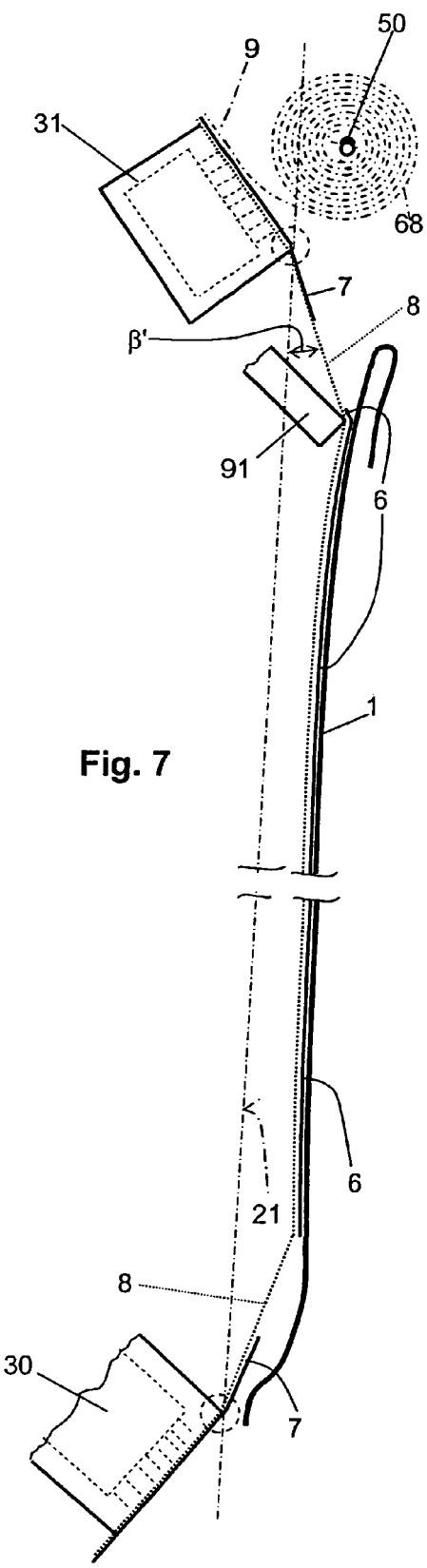

In order to prevent unacceptably great expansion in the film composite 5, and in particular in the paint film blank 6, particularly towards the end of the wiping-on process, the end suction gripper 31 is moved towards the bodywork surface 1 to be bonded over (see FIG. 7). At the same time, the end projection 11 of the film composite 5, which is gripped by the end suction gripper 31, can in this phase be allowed to continue sliding, which can be achieved by deliberately reducing the vacuum in the end suction gripper 31, in the sense of reducing the holding force.

It is important for good adhesion of the applied paint film to the bodywork for the paint film blank 6 to be wiped on with a very high linear pressure during the application process. To be precise, this linear pressure should be in the range from 10 to 50 N/cm, and preferably 20 to 30 N/cm.

It is not so simple on the one hand to make it possible to exert such high linear pressures while, on the other hand, nevertheless making it possible to produce a linear pressure which is as uniformly high as possible over the entire wiper width despite slight curvature or inclination of the bodywork surface to be bonded over. Furthermore, no pressure points should remain on the paint film to be applied despite the high linear pressures. In order to take account of all this, the paint film blank 6 is wiped on using a wiper 91 composed of a hard felt with a thickness of about 10 to 20 mm.

Starting with the paint film composite which is aligned accurately in a position above the point at which it is to be applied to the bodywork part and held at a short distance from it (see, for example, FIG. 6), the wiper 91 is placed on the film composite and is guided along the film composite with a high contact pressure within the application tool, with the application tool being locked in a fixed position above the bodywork part in the longitudinal direction of the paint film blank. In this case, the adhesive face of the paint film 6 is wiped onto the bodywork surface with a high linear pressure, with very small gas enclosures being forced out of the adhesive join, as it progresses, during this process. In addition, air which has become adhesively bonded to the exposed adhesive layer is first of all forced out by the high wiper linear pressure. In consequence, not only does the paint film adhere very firmly to the bodywork surface, but it is also impossible for microscopic gas enclosures to accumulate retrospectively to form visible gas bubbles because, as stated, there are no longer any gas enclosures remaining in the adhesive joint.

One special feature of the paint film application to vertical frame limbs of passenger vehicle side doors is that, once the paint film blank has been correctly adhesively bonded onto the flat face of the frame limb, its projecting side edges must be bent around and must be pressed onto the rear face. If no robot tool has yet been provided for this purpose, this can be done in the conventional manner manually, in some circumstances with the assistance of special handtools for pressing it onto the rear face.

Following the fundamental explanation of the method for automatic paint film application, various features and/or variants of a film composite which is suitable for automation will first of all also be dealt with, with reference to FIGS. 16a, b, c and FIGS. 17a, b, to the extent that this has not already been done in conjunction with the description of the application method, before describing, further below, details of the design of the application tool 20, 20', 20". Various exemplary embodiments of film composites, which will first of all be dealt with in the following text with reference to their corresponding features, are illustrated in the drawings.

The outer protective strip 8 is provided with a reasonably strongly adhesive layer, so that it can be pulled off the paint film 6 without a large amount of force and, in particular, without leaving any residue. The lower protective strip 9, on the other hand, is provided with an antistick coating, so that it can likewise be pulled off the very strongly adhesive layer of the paint film 6, without being torn into or being delaminated. It is desirable for the lower protective strip 9 to be automatically detached from the adhesive face of the paint film blank 6 when it is bent through a sharp angle, that is to say when it is bent with a small bending radius. In any case, the lower protective strip 9 should be more easily detachable from the adhesive face of the paint film or of the supporting film than the outer protective strip 8 from the outer face of the paint film.

The film composite 5 according to the exemplary embodiment shown in FIGS. 1, 2, 6 and 16a has been used as the basis for the description of the application method dealt with above. This film composite 5 has the common feature with the other exemplary embodiments shown in FIGS. 16b, 16c, 17a and 17b that both the start-side and end projections 10 and 11 (FIGS. 16a, 16b and 16c) and the projections 10' and 11' (FIGS. 17a and 17b) are provided, on which the film composite can be held firmly outside the paint film blank 6. A supporting film 7 whose size corresponds to the thickness of the paint film is inserted between the outer and the lower protective strips 8 and 9, respectively, in the area of the projections 10 and 11, so that the film composites 5, 15 and 15' have the same thickness D in the area of these projections 10 and 11 as in the area of the paint film blank 6. The film composites 5, 15 and 15' are accordingly particularly highly suitable for being offered in a stacked form. In contrast, in the case of the film composites 16 and 16' shown in FIGS. 17a and 17b, there is no supporting film in the area of the projections 10' and 11", which reduces the cost. These film composites can admittedly not be stacked particularly flat or in a planar form when in relatively large quantities, but they may still be in a sufficiently flat and planar form when the quantities in the stack are small. This type of film composite may in fact be usable when the manufacturing batch sizes per shift are small.

In the case of all three film composites 5, 15 and 15' (exemplary embodiment as shown in FIGS. 16a, 16b, 16c), the supporting film 7 may be identical to the paint film 6. In any case, the supporting film should be detached from the usable part of the paint film blank 6 by means of an interruption 13, such that it is detached from the paint film 6 without any further measures.

In conjunction with the FIGS. 1, 2, 6 and 16a, it should also be mentioned that, in the case of this exemplary embodiment, a supporting film 7 of the same thickness as the paint film 6 is inserted between the outer protective strip 8 and the lower protective strip 9 not only in the two projections 10 and 11, but also in each case in the pulling-off lug 12 which in this case is provided only at the start-side end. Apart from small interruptions 13 and 14, the film composite 5 has three layers over its entire length, that is to say even into the pulling-off lug 12. This results in a thickness D which is uniform over the entire length of the film composite 5, so that these film composites can be stacked flat and in a planar form even in relatively large quantities.

In order to ensure the pulling-off function of the pulling-off lug 12 for the film composite 5, only the lower protective strip 9 is formed continuously into the pulling-off lug 12 while, in contrast, the outer protective strip 8 and the supporting film 7 are provided with a narrow slot 14 along a transverse line locally over the entire width of the film composite 5. This slot runs transversely with respect to the longitudinal direction of the film composite 5 along a line which is located in the area between the start-side projection 10 and the pulling-off lug 12.

The exemplary embodiment of the film composite 15 shown in FIG. 16*b* differs from that shown in FIG. 16*a* only in the design of the pulling-off lug 12', which has a single layer in the case of the film composite 15 and is an integral component of the lower protective strip 9. Since the film composite need be laid flat and in a planar form only in the area of the paint film blank and of the projections 10 and 11 during the stacking process, the pulling-off lug 12' can hang down somewhat without any problems within the stack of film composites. As soon as one film composite has been picked up in the application tool, the associated pulling-off lug 12' projects into the area of the gripping tool (which is indicated by dashed-dotted lines in FIG. 16*b*) of a pulling-off apparatus which is integrated in the application tool; the pulling-off lug 12' can be gripped securely by this gripping tool despite hanging down to a certain extent.

In the case of the film composite 15' illustrated in FIG. 16*c*, not only is a (single-layer) pulling-off lug 12' provided on the (three-layer) start-side projection 10, but a pulling-off lug 12" is also arranged at the outermost end of the end projection 11; both pulling-off lugs are part of the lower protective strip 9. This type of embodiment of the film composite 15' is intended for complete removal of the lower protective strip 9 from the film composite before application of the paint film blank. This process of pulling the lower protective strip off completely can be carried out within the application tool by the two pulling-off lugs 12' and 12" of the film composite 15' which has been picked up in the application tool being gripped by moving gripping tools which are integrated in the application tool and being moved away from the firmly held film composite transversely with respect to the picking-up plane, as is indicated by dashed-dotted lines in FIG. 16*c*. As soon as the lower protective strip 9 has been completely detached from the film composite, the protective strip which has been pulled off can be thrown away into a scrap container by opening the gripping tools. The advantage of the film composite 15' and of the previous complete removal of the lower protective strip 9 before the application of the paint film is that the application tool can be designed to be considerably simpler than one in which the lower protective strip is removed during the application process. In some circumstances, it appears that this method of operation may be acceptable in clean room conditions, which nowadays are widely used for automobile painting systems.

The further exemplary embodiment of a film composite 16 which is illustrated in FIG. 17*a* largely corresponds, apart from the projections 10' and 11', which have two layers, that is to say they have no protective film between them, to the film composite which is shown in FIG. 16*b*. The film composite 16 has three layers only in the area of the paint film blank 6 itself. The pulling-off lug 12' which is fitted at the start end has only a single layer. This film composite 16 is particularly cost-effective, owing to the absence of the interposed supporting films, but cannot be stacked flat and in a planar form in relatively large numbers into the area of the projections 10' and 11'. If the numbers of film composites 16 within a stack are small, reliable and accurately positioned transfer of a film composite to the application tool may, however, nevertheless be possible. Since a (single-layer) pulling-off lug 12' is provided only at the start-side end in the case of the film composite 16, this film composite is suitable for the lower protective strip to be removed at the same time as the application process, as has already been described further above in conjunction with FIGS. 1 to 3 and 5 to 8.

The last exemplary embodiment, which is illustrated in FIG. 17*b*, of a film composite 16' differs from that illustrated in FIG. 17*a* in that—in a similar way to that in the case of the film composite shown in FIG. 16*c*—a (single-layer) pulling-off lug 12" is also provided at the rear end of the film composite 16'. This film composite 16' is thus suitable for complete removal of the lower protective strip 9 from the film composite within the application tool before the application of the paint film blank.

With regard to the apparatus used as a machine for automated application of self-adhesive paint films to bodywork parts, the application tool which has already been mentioned a number of times should be mentioned here in particular, as is illustrated in various exemplary embodiments 20, 20' and 20" in the drawings. Irrespective of the embodiment, the rear face 23 of the application tool is fitted to the hand joint 25 of the working arm 24 of a freely programmable industrial robot and can be handled by it freely in three dimensions. Two suction grippers 30 and 31, to which air or a vacuum can be deliberately applied are arranged at a distance from one another on the opposite flat face of the application tool, specifically on the working face 22, and can be used to grip the prefabricated paint film blank 6, which is contained in a film composite that is suitable for automation, at two opposite ends on the outside, to hold it stretched out, and not only to be freely handled in this state by the industrial robot or application tool, but also to be applied in an accurate position to the bodywork part 1.

The areas of correspondence between the various application tools 20 (FIGS. 1-3 and 5-8), 20' (FIG. 4) and 20" (FIG. 9) will be described first of all. In all three exemplary embodiments, the two suction grippers 30 and 31, 30' and 31' and, respectively, 30" and 31" are in each case mounted in the application tool such that they can pivot, and are provided with a pivoting drive 37, 40, 40'. The sucking picking-up surface 32 of the suction grippers can thus be pivoted onto a standard picking-up plane 21—the picking-up position—for transferring a paint film composite 5 (which is provided in a flat planar form) on the one hand, or to a working position, on the other hand, with these two positions being approximately in mirror-image form with respect to one another. In the pivoted working position, the sucking picking-up surfaces 32 project obliquely from the picking-up plane 21, that is to say at an angle $\alpha$, $\alpha'$ in the direction of the rear face 23 of the application tool. This pivoting movement of the suction grippers is used to ensure that the gripped projections 10 and 11 of the film composite are held firmly on the suction grippers despite the stretched-out film composite being pushed in a V shape from the picking-up plane during the application process—see, by way of example, the angle $\beta$ in FIG. 6. The capability of the suction grippers to pivot is physically designed such that the tensile stress in the film composite that has been picked up is changed no more than negligibly by a pivoting movement of the suction grippers 30, 31. This means that the mutually facing boundary edges 33 and 33' of the sucking picking-up surfaces 32 must not be any further apart from one another after the pivoting movement of the suction grippers than before the pivoting movement. The various exemplary embodiments of the application tools differ from one another in terms of the design solution to this problem, although this will not be described until further on in the following text.

Figure 9:
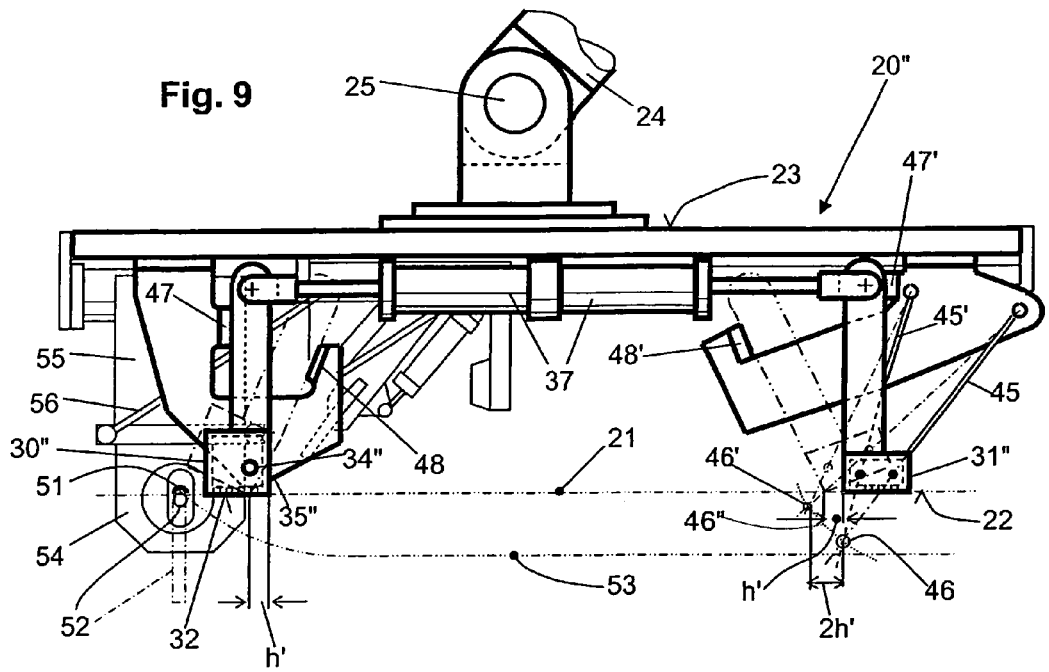
FIG. 9 shows a side view of a further variant of an application tool, in which the start-side suction gripper is mounted on a recessed pivoting journal and the end suction gripper is mounted by means of a four-bar linkage such that it can pivot such that the facing boundary edge of the end suction gripper is moved during the pivoting of the suction grippers, on the basis of the magnitude and direction, in the same direction as the corresponding boundary edge of the start-side suction gripper.

In conjunction with the corresponding features of the various application tools 20, 20' and 20", the pivoting levers 36, 36', on which the pivoting drives 37 (FIGS. 3 and 9) as well as 40 and 40' (FIG. 4) act, and, furthermore, the associated preferably adjustable stops which define the picking-up position and the working position of the suction grippers, should also be mentioned. In the case of the application tool 20 shown in FIG. 3, the stops 38 and 38', respectively, define the picking-up position, which is illustrated by solid lines, while the stops 39 and 39', respectively, define the respective working positions of the suction grippers 30 and 31, which are indicated by dashed-dotted lines. The stops which define the picking-up position of the suction grippers 30' and 31' are annotated 43 and 43' for the application tools 20' shown in FIG. 4 while, in contrast, the stops which are responsible for the working position are provided with the reference symbols 44 and 44'. Finally, the corresponding reference symbols for the application tools 20" with the suction grippers 30" and 31" as shown in FIG. 9 should also be mentioned: stops 47 and 47' for the picking-up position (solid lines), and stops 48 and 48' for the working position (dashed-dotted lines).

In the case of all of the described application tools, a gripping tool 50, 50', 80, 80', which can be moved parallel and various embodiments of which are illustrated, is furthermore arranged in a corresponding manner adjacent to the start suction gripper 30, 30', 30", which grips the start-side projection 10 of the film composite. This gripping tool is mounted such that it can move and is provided with an appropriate movement drive such that it can on the one hand be moved onto the picking-up plane 21 alongside the start suction gripper such that it is ready to pick up—the start position. On the other hand, the gripping tool can be moved from this start position under the picking-up plane 21 onto a working plane 53 for the gripping tool, and within this working plane parallel to said working position and parallel to itself. The further details of the gripping tool itself will be described further below in conjunction with the individual exemplary embodiments relating to this. At this point, it should just be noted that the gripping tools in all of the illustrated exemplary embodiments are mounted such that they can rotate, are coupled to an appropriate rotary drive and are used as a coil core for the lower protective strip 9, whose end is gripped. For this purpose, the gripping tool is mounted such that it can rotate in an angled drive 54 which is arranged laterally offset alongside the suction grippers 30 and 31 and from which it projects freely in the axial direction. The gripping tool can be caused to rotate deliberately by means of the drive motor 55 for winding-up purposes.

The physical design of the moving guidance of the gripping tool is illustrated in a corresponding form in the various exemplary embodiments of application tools; this can best be seen in FIG. 5. In the exemplary embodiment shown there, the gripping tool is in the form of long-nose pliers which are mounted such that they can rotate and by means of which the protective strip 9, whose end is gripped, can also be wound up at the same time.

The drive block of the gripping tool, which comprises the angled drive 54 and the motor 55, is coupled by means of parallelogram guides 56 to a carriage 59, so that the drive block and the long-nose pliers can be moved translationally on a circular arc from the start position, which is illustrated by solid lines in FIG. 5, to the working position, which is indicated by dashed-dotted lines. In the start position—which is defined by the stop 58 attached to the carriage 59—the center of the long-nose pliers is at the same level as the picking-up plane 21 of the application tool. In contrast, after they have been moved to their working position on the working plane 53, the long-nose pliers are located underneath the picking-up plane. The working position is defined by the stop 58', which is likewise attached to the carriage 59. A linear movement drive 57 in the form of a working cylinder is provided in order to move the drive block and the long-nose pliers from the start position to the working position, and vice versa, which working cylinder in the illustrated exemplary embodiment connects two diagonally opposite hinge points of the four-bar linkage, which is covered by the two parallelogram guides 56 and their joints. The carriage 59 is guided on guide rods 60 such that it moves parallel to the picking-up plane 21. The carriage and the long-nose pliers can be moved parallel to the working plane 21 by means of a linear movement drive 61, which is attached to the application tool and is in the form of a working cylinder whose piston rod is coupled to the carriage 59. The linear movement of the carriage 59 corresponds at least to the length L of the paint film blank 6 to be applied.

Bearing in mind this not inconsiderable length L of the required linear movement of the carriage 59, the physical length of the application tool, which is located horizontally in the figures, is particularly large, specifically because not only the linear movement which has been mentioned or the guide rods 60 but—at least in the illustrated exemplary embodiments—the length of a working cylinder of corresponding length as the linear movement drive 61 for the carriage 59 must also be accommodated on the application tool, as well. If the paint film blanks to be applied are very long, for example blanks which must be applied over the width of the roof of the bodywork, it may thus in some circumstances be expedient for the linear movement drive for the carriage to be in the form of a spindle drive, in which case the spindle can be arranged in a space-saving form between the guide rods.

With regard to the position and orientation of the gripping tool and of the long-nose pliers with respect to the physical depth relative to the plane of the drawing in the various illustrations of the application tools, it should be noted that the long-nose pliers are located in the same area as that in which the suction grippers 30, 31, which have already been mentioned, and the film composite which has been picked up by them are also located. The wiper 90, which is described further below, is likewise fitted to the carriage 59 and is used to wipe the paint film onto the bodywork, is also located in the same area. The drive block 54/55 for rotation of the gripping tool must therefore lie on a plane beyond the gripping tool, the suction grippers, the film composite and the wiper.

In principle, it would also be feasible to move the moving gripping tool only linearly within the working plane in order to grip the end of the lower protective strip and to pull it off the film composite—apart from changing the gripping tool from the start position to the working plane 53—so that there is no need for a complex rotary drive for the gripping tool. However, at least when there is a requirement for the protective strip to be pulled off at the same time as the application process, this would be dependent on the linear movement of the gripping tool guided in this way corresponding to twice the length L of the paint film blank to be applied; furthermore, the gripping tool guided in this way would have to be driven at twice the speed of the carriage 59 which guides the wiper 90/91. This is all dependent not only on complex duplicated carriage guidance but also on very considerable physical lengths of the application tool, making the latter unnecessarily heavy and cumbersome. The gripping tool, which is mounted such that it can move, is therefore—as stated—at the same time in the form of a winding apparatus in the illustrated exemplary embodiments, so that it can be held together with the wiper 90, 91 on the carriage 59 and can be moved together with it, although this equally allows the lower protective strip to be pulled off the paint film at the same time as the application process.

The already mentioned wiper 90, 91, which is arranged within the application tool and is used in the actual application phase should be mentioned as a further physical component of the application tools 20, 20', 20" which is significant to the method. This is arranged such that it can move in two ways, and is provided with an appropriate linear movement drive. On the one hand, the working edge of the wiper can be moved from a waiting position, which is illustrated by solid lines in FIG. 5 and in which it is pushed back from the picking-up plane 21, to a working position which is indicated by dashed-dotted lines and is located close to the picking-up plane 21, and in the working position it can be pressed with a specific force against the bodywork part 1 to which the paint film is to be applied. For this purpose, the carriage-like wiper holder 90—as can be seen most clearly in FIG. 5—is mounted on a carriage guide 93, which is inclined with respect to the picking-up plane 21, and is provided with an appropriate adjustment drive 92 in the form of a working cylinder, which also applies the contact force to the wiper. On the other hand, the wiper can be moved in a straight line and parallel to the picking-up plane 21 when in the working position. In order to allow this, the carriage guide 93 in the exemplary embodiment illustrated in FIG. 5 is itself arranged on the already mentioned carriage 59, which is also indirectly fitted with the drive block 54/55, which is held such that it can pivot, for the long-nose pliers. The linear movement drive 61 can be used to move the carriage and the wiper 91 parallel to the working plane 21, with the paint film 6 being wiped onto the bodywork part 1 with a specific linear pressure.

As has already been mentioned, the paint film must be wiped on with a very high linear pressure during the actual application phase although, on the other hand, the bodywork surface is slightly curved. In order to make it possible to produce a linear pressure which is as uniformly high as possible over the entire wiper width at the same time, and nevertheless not cause any pressure points on the paint film to be applied, the wiper 91 is composed of a hard felt.

As can be seen from FIG. 3, a horizontal stacking platform 96, which is mounted elastically on a base frame 100 and has side holding and guide webs 97, 98, is arranged in the working area of the industrial robot such that it handles the application tools 20, and on which horizontal stacking platform 96 the film composites can be stacked to form a stack 95 and can thus be offered lying horizontally to the application tool 20. The holding and guide webs 97, 98 at the sides are used to align the film composites contained in the stack accurately in position one above the other. For the sake of completeness, it should be mentioned that the stacking platform need not be aligned exactly horizontally, although this arrangement is recommended by preference. In specific cases, a slight inclination of the stack may possibly be worthwhile.

In the illustrated exemplary embodiment, the stacking platform, which is elastically supported underneath, is guided by means of side guide journals in vertical elongated holes in the guide webs 98, so that the stacking platform can not only be moved vertically but can also be tilted to a limited extent about the longitudinal axis defined by the guide journals 99, while maintaining its defined position with respect to the horizontal coordinates. This tilting capability is made possible by the elastic intermediate elements 104 between the supporting pillars 101 and the lower face of the stacking platform. A certain amount of axial compression allowed by the elastic intermediate elements also allows limited free tilting of the stacking platform about a pivoting axis at right angles to the plane of the drawing. Furthermore, the guide pillars 101 can move in vertical guides 102 and are clamped by means of linear movement springs 103 in an upper limit position, which is bounded by stops (adjusting nuts 105). This also allows the stacking platform to flex translationally in the vertical direction. This flexibility of the stacking platform, which is elastic in a number of ways even if limited, is important for the careful picking up of the film composite, which is offered on the stacking platform, by the robot-controlled application tool. Any position or orientation discrepancies which are within the range of the movement tolerance of the industrial robot between the film composite offered for transfer on the one hand and the transfer position of the application tool on the other hand cannot cause any damage to or pressure points on the film composite by virtue of this flexibility, because the stacking platform can automatically and freely match itself to any minor position or orientation discrepancy of the application tool.

With the stacking platform being vertically flexible, it would intrinsically be feasible for the application tool to be moved towards the film stack 95 from above in the vertical direction and for the suction grippers 30 and 31 to be placed on the upper end of the stack, in which case this placement can be detected by tactile sensors of widely differing types and in widely different arrangements. However, this would mean that the application tool would have to move through a greater or lesser distance in an inching mode before reaching the stack 95, depending on the remaining height of the stack, in order to prevent the suction grippers from striking the stack too hard, and this would disadvantageously lengthen the cycle time.

In order to avoid this, the stacking platform 96 is held at a variable height and is provided with a controllable height adjustment drive such that the upper edge of the stack 95 is always at a constant height level, irrespective of the number of film composites stacked on it.

In the case of the exemplary embodiment illustrated in FIG. 3, the controlled height adjustment of the stacking platform is achieved by the following physical components. The upper edge of the stack is recorded by an adjustable height light barrier 109, which has two light beams, at slightly offset heights, with separate detectors. When the height adjustment is in the rest state, the lower light beam should be darkened by the stack while, in contrast, the upper light beam must not be darkened. If the lower light beam is not darkened, then the stack is slowly raised until the lower light beam is darkened by the stack once again. If, in contrast, both light barriers are darkened, then the stack is slowly lowered, to be precise until, and only until, the stack no longer obstructs the upper light beam.

The signal from the light barrier is passed indirectly via a suitable controller 110 to an electrical adjusting motor 107, which raises or lowers the stacking platform as required. For this purpose, the supporting pillars, which are guided in the vertical guides 102 such that they cannot twist, are provided with adjusting spindles 106 underneath. Adjusting nuts 105 which act as movement-limiting stops can be screwed thereto, abut underneath against the end face of the vertical guides 102, and determine the height of the supporting pillars 101. The supporting pillars are continuously prestressed upwards by the linear movement springs 103, and hold the adjusting nuts against the stop. The adjusting nuts themselves can be rotated by the adjusting motor 107 via a toothed belt 108, raising or lowering the stacking platform depending on the rotation direction of the adjusting nuts.

A stacking platform such as this, or a similar stacking platform which is elastically flexible in a limited manner is also provided for the other application tools.

The method of operation of the exemplary embodiments of the application tool shown in FIGS. 1 to 9 will now be described in the following text, with a distinction being drawn between a preparation phase for the application process, and the actual application phase:

In the preparation phase for the application process, once the film composite 5 has been picked up in the application tool 20, the long-nose pliers 50 grip the pulling-off lug 12, which is fitted to the start end, of the film composite that has been picked up. The two suction grippers then pivot from the picking-up position, which is illustrated by solid lines in FIG. 4, to the angled working position, which is illustrated by dashed-dotted lines in FIG. 5, with the lower protective strip and the supporting film being detached from the outer protective strip in the area of the start-side projection, at the start-side end of the film composite, by virtue of the relative movement of the start-side projection 30 with respect to the long-nose pliers 50, which are initially still fixed in the waiting position. The long-nose pliers are now moved from the start position to the working position or to the working plane 53, with the winding drive 55 being switched on at the same time. In this phase, the winding speed is matched to the linear movement speed of the long-nose pliers on the initial circular arc in such a way that that part of the lower protective strip 9 which has been pulled off the film composite is on the one hand wound with a specific density onto the long-nose pliers while, on the other hand, a specific initial section of the adhesive face of the paint film blank is exposed. The position of the drive block 54/55 at the end of this preparation phase for the application process is indicated by dashed-dotted lines (left-hand position) in FIG. 5. At least the last processes in this preparation phase preferably take place with the application tool already being in a position in which the film composite is aligned in the correct position at a short distance in front of the bodywork part. The actual application phase of the paint film blank starts from the position of the drive block 54/55 which is shown by dashed-dotted lines and is indicated on the left in FIG. 5.

Figure 6:
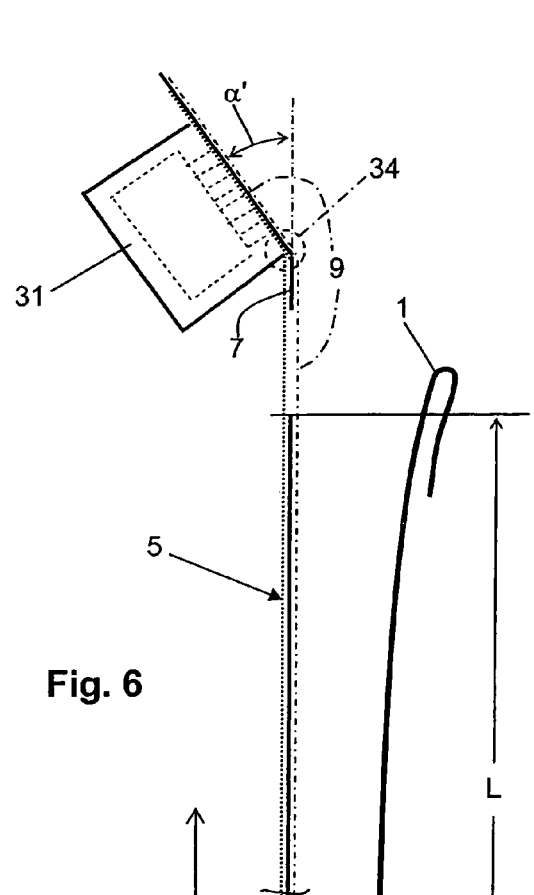
FIGS. 6 to 8 show three different phases during the application of a paint film blank to a bodywork part, specifically the start of the wiping-on process in FIG. 6, the end of the wiping-on process in FIG. 7, and with the outer protective strip being pulled off the applied paint film in FIG. 8.
Figure 8:
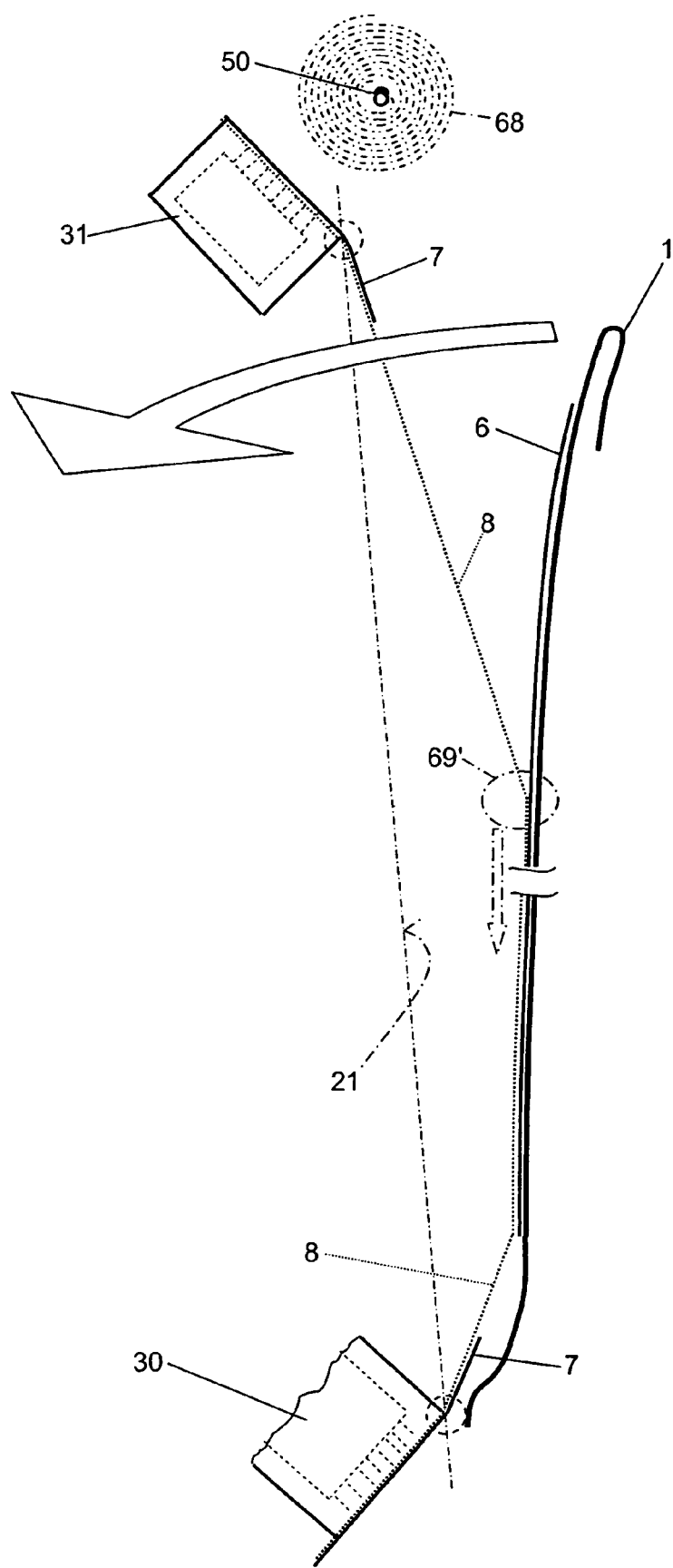

At the start of the actual application phase, the wiper 90/91 is lowered from the waiting position, which is illustrated by solid lines, in the direction of the arrow onto the film composite 5, which is stretched out on the picking-up plane, with an edge, which is composed of felt, of the wiper blade 91 that is held in the wiper holder 90 at the bottom being placed down in front of the paint film blank 6 in the area of the film interruption 13, as shown of FIG. 6. Once the paint film is wiped onto the frame limb of the window frame with the vehicle side door, which is supported in a fixed position and in a defined orientation, being in the installed state, the illustration in FIGS. 6 to 8 is accordingly chosen to be in the vertical position. The contact pressure exerted on the wiper causes the film composite to be pressed against the surface to which it is to be applied of the bodywork part 1 that is located alongside, with the film composite first of all being pressed out of the stretched-out position in a V-shape. The shorter limb of the film composite which has been stretched to a V-shape in this case initially assumes a maximum angle of $\beta$ with respect to the picking-up plane 21, which angle $\beta$ must be less than the pivoting angle $\alpha$ of the start suction gripper 30 in order that the film composite cannot be detached from the sucking contact surface of this suction gripper. Starting with the wiper 91 in the initial position shown in FIG. 6, it is now moved along the film composite within the application tool with a high contact pressure, with the application tool being locked in a fixed position above the bodywork part in the longitudinal direction of the paint film blank.

While the paint film is being wiped onto the bodywork surface, the long-nose pliers 50, which are driven in a winding sense, are moved forwards translationally at the same speed as the wiper and at a constant distance A from the wiper. At the same time, the long-nose pliers are driven at an angular velocity such that the lower protective strip 9, which is detached from the paint film at the detachment point 69 as it moves forwards, is wound up continuously and tightly to form a coil 68. In this case, the circumferential speed of the winding process is constant, and is specifically equal to the translational speed of the wiper while, in contrast, the rotation speed of the long-nose pliers 50 decreases as the coil diameter increases. The form composite 5 is supported by the coil as it becomes larger, in the area of the detachment point 69 as it moves forwards.

FIG. 7 illustrates the end of the wiping process. The wiper 91 has reached the end of the paint film blank 6, and the coil 68, which is now already very large, of the lower protective strip is already located outside the bodywork part. The end suction gripper 31 has been moved towards the bodywork part towards the end of the wiping process in order to ensure that the spreading angle $\beta'$ of the form composite with respect to the picking-up plane 21 does not become too large, but in any case does not become any larger than the pivoting angle $\alpha'$ of the end suction gripper 31, in order to ensure that the end projection 11 remains held firmly on the suction gripper. The vacuum in the interior of the end suction gripper 31 is admittedly reduced during this final phase in order to reduce the holding force, thus allowing the film composite to continue sliding without any excessive increase in the tensile stress. It is more important that the holding force, which is defined by the magnitude of the vacuum and is reduced, does not collapse in an uncontrolled manner.

In the stage of the application process shown in FIG. 8, the paint film 6 has already been completely adhesively bonded onto the bodywork part 1, and the lower protective strip has been pulled completely off the film composite and has been wound up to form a coil 68. All that is now still necessary is to pull the outer protective strip 8 off the outer face of the applied paint film 6, with this outer protective strip 8 still being held firmly at both ends by means of the two suction grippers 30 and 31 in the application tool. This pulling-off process is carried out by means of a large pivoting movement of the application tool away from the bodywork part, with the detachment point 69' of the outer protective strip running from the end of the paint film to its start, in the opposite direction to the wiping-on direction. In FIG. 8, the outer protective strip is pulled off by a large movement of the end suction gripper. However, it would be equally feasible for the outer protective strip to be pulled off by means of a pulling-out movement of the start-side suction gripper.

Once the outer protective strip has been pulled off, both protective strips can be thrown away via a scrap container. The outer protective strip, which is held by the suction grippers, is thrown away by switching off the vacuum and by applying air to the suction grippers, which can be done in virtually any desired position of the application tool. In contrast, in order to throw away the lower protective strip which has been wound up on the long-nose pliers, the application tool must be moved to a position such that the long-nose pliers are aligned approximately parallel to the direction of the force of gravity, with their free end pointing downwards, so that the loosened coil 68 can fall away axially from the coil core by the force of gravity whilst the long-nose pliers have been opened.

As has already been mentioned, one important feature is the capability of the suction grippers to pivot while maintaining an approximately uniform tensile stress in the film composite that has been picked up, with the various application tools differing from one another in this respect.

In the first exemplary embodiment of an application tool 20, which is indicated or illustrated in FIGS. 1 to 3 and 5 to 8, the pivoting journals 34 of the two suction grippers 30, 31 are arranged concentrically with respect to the boundary edge 33, 33', which faces the paint film blank 6, of the suction grippers, that is to say the geometric loci of the pivoting axes are located on the picking-up plane 21 of the application tool. The two suction grippers thus pivot about the boundary edges 33 and 33' in this exemplary embodiment, with the consequence that the tensile stress in the film composite 5 that has been picked up is not varied by a pivoting movement. The advantage of this solution is its physical simplicity; however, it has the disadvantage that the bearing 35 for the pivoting journals, and even the pivoting journals 34 themselves, project downward beyond the picking-up plane 21 or working face 22 of the application tool, which in some circumstances may have a disturbing effect on the process of picking up a thin film composite from a flat substrate.

In order to keep the lower face of the application tool underneath the picking-up plane 21 completely free of components, even though the suction grippers must be able to pivot with a constant tensile stress in the film composite which has been picked up, the further exemplary embodiment of an application tool 20' as shown in FIGS. 4 and 5 may be used in addition to the application tool 20'' (FIG. 9) which will be dealt with further below, with the features that are of interest here being illustrated only in FIG. 4.

The pivoting bearing with the bearing journal 34 and the journal bearing 35 for the start-side suction gripper 30' illustrated on the left are in the form of a conventional journal bearing, whose center point is offset with respect to the picking-up plane 21 of the application tool 20' in the direction of its rear face 23 to such an extent that those outlines of the journal bearing 35' which are closest to the picking-up plane 21 are themselves still offset with respect to the picking-up plane 21 of the application tool 20' in the direction of its rear face 23. The journal bearing 35' of the start-side suction gripper 30' is likewise mounted immovably on the application tool, in the same way as the associated separate pivoting drive 40 in the form of a working cylinder which acts on the pivoting lever 36.

The situation for the end suction gripper 31' is different. Admittedly, this suction gripper is also equipped with a conventional journal bearing with a bearing journal 34' and a journal bearing 35' which are offset by preferably the same amount as the start-side suction gripper 30' towards the rear face 23 from the picking-up plane 21. However, the journal bearing 35' and the associated, separate pivoting drive 40' are arranged on a carriage 41 which is mounted such that it can move longitudinally, so that the end suction gripper 31' is held on the application tool 20' such that it can move. In order to maintain a certain tensile stress in the film composite that has been picked up, the carriage, and with it the suction gripper, are prestressed, for example by means of a tensioning spring 42, in the direction of a limit position which is assumed when picking up a film composite and which, in the illustrated exemplary embodiment, is predetermined by a stop ring 41' which can be fixed on the carriage guide. Instead of a tensioning spring, a small working cylinder can also be used, by means of which it is possible to apply a variable clamping force which is independent of the linear movement, on the film composite.

The method of operation of the maintenance, as illustrated in FIG. 4, of a specific tensile stress in the film composite which has been picked up despite pivoting of the suction grippers about pivoting journals 34, 34' which are offset with respect to the film plane is now as follows: first of all, in the picking-up position which is illustrated by solid lines in FIG. 4, the suction gripper picks up a film composite in the application tool, with the carriage 41 of the end suction gripper being in the limit position, which is defined by the stop ring 41'. The pivoting of the start-side suction gripper 30' in the clockwise direction results in the front boundary edge of the contact surface 32 being moved to the left through the distance h. The end suction gripper 31' is pivoted through an angle of approximately the same magnitude, but in the opposite pivoting direction, so that the left-hand boundary edge is moved off its contact surface 32—with respect to the movable system for holding the end suction gripper 31'—through approximately the same distance h to the right, that is to say in the opposite direction to the other suction gripper 30'. This does not in fact lead to an increase in the tensile stress in the film composite that has been picked up because the end suction gripper 31', which is held such that it can move, can freely follow the tension which is exerted by the start-side suction gripper 30' and is directed to the left in the film composite, but against the effect of the tensioning spring 42, in the process traveling over twice the offset distance, specifically the distance 2·h. The important factor in this case is that the start-side suction gripper 30' is held inflexibly in the application tool, and cannot be moved within the application tool by any force acting in the tension direction of the film composite while it is being wiped on.

The design shown in the exemplary embodiment in FIG. 4 is advantageous for stabilization of the tensile stress in the film composite that has been picked up during the pivoting movements of the two suction grippers in opposite directions to one another, firstly with regard to the physically simple journal bearing on the two suction grippers and secondly with regard to the fact that the picking-up plane 21 of the application tool 20' does not have physical components which project downward beyond it and, of course, because the remaining tensile stress in the film composite that has been picked up remains at a controlled level. A further advantage is that the application tool 20' as shown in FIG. 4 can be converted without any problems for different lengths L of the film composite or of the paint film to be applied, by virtue of the carriage 41 for the end suction gripper, specifically just by changing the position of the stop ring 41'. Taken together, these advantages in their own right justify the increased complexity for the separate carriage 41 for the end suction gripper 31'.

9 shows a further exemplary embodiment of an application tool 20'' which avoids a complex carriage structure. The pivoting bearing 34'', 35'' for the start-side suction gripper 30'' illustrated on the left in FIG. 9 is—in a similar way to that for the application tool shown in FIG. 4—likewise in the form of a conventional journal bearing, whose center point is offset by a certain extent in the direction of its rear face 23 with respect to the picking-up plane 21 of the application tool 20", so that those outlines of the journal bearing 35" which are closest to the picking-up plane 21 are still separated in the upper direction from the picking-up plane 21 of the application tool 20".

The end suction gripper 31", which is mounted such that it can pivot, can admittedly likewise move in the longitudinal direction relative to the application tool 20", but not by means of a carriage guide. In fact, in the case of the exemplary embodiment shown in FIG. 9, the capability of the end suction gripper to pivot is physically combined with its capability to move longitudinally, which is achieved by means of a four-bar linkage in the illustrated exemplary embodiment. This linkage is formed by two rockers 45 and 45' which on the one hand are each articulated on the end suction gripper 31", and on the other hand are each articulated on the application tool 20". The connecting lines between the hinge centers of the rockers 45, 45' intersect in any desired movement position of the four-bar linkage, with the mutual intersection of these connecting lines representing the moving instantaneous center of rotation, that is to say the instantaneous center of rotation of the pivoting movement of the end suction gripper 31". 46 denotes the instantaneous center of rotation at the start of the pivoting movement, that is to say the instantaneous center of rotation when the suction gripper 31" is in the picking-up position, while in contrast the instantaneous center of rotation at the end of the pivoting movement, that is to say when the suction gripper 31" is in the working position, is annotated 46'. The instantaneous center of rotation in the intermediate positions moves on the instantaneous center of rotation path 46", which is indicated by dots. The position of the hinge points including the length of the rockers 45 and 45' is on the one hand chosen such that the instantaneous center of rotation 46, 46' is offset downward with respect to the picking-up plane 21 of the application tool 20" in all positions of the suction gripper 31", that is to say in the opposite direction relative to the picking-up plane to the journal bearing 34", 35" for the start-side suction gripper 30".

Furthermore, the four-bar linkage bearing for the end suction gripper 31" is formed with respect to the mutual arrangement of the hinge points and with respect to the length of the rockers 45, 45' such that the position offset (distance h') caused by the pivoting process of that boundary edge of the end suction gripper 31" which is close to the blank is of the same size, in terms of magnitude and direction, as the corresponding position offset distance h' of the start-side suction gripper 30". In this case, the instantaneous center of rotation moves on the instantaneous center of rotation path 46" which has been mentioned, and in the process travels through approximately twice the distance (2·h') in the longitudinal direction of the end suction gripper itself (h').

The advantage of the pivoting bearing shown in FIG. 9 combines the advantages of a physically simple configuration with the normal advantages of the exemplary embodiment shown in FIG. 4. Conversion of the application tool 20" to a different length of the film composite is likewise possible in this case, as long as the frame to which the upper pivoting bearings of the rockers 45 and 45' and the stops 47' and 48' are fitted can be screwed on at different positions in the longitudinal direction of the application tool.

Figure 10:
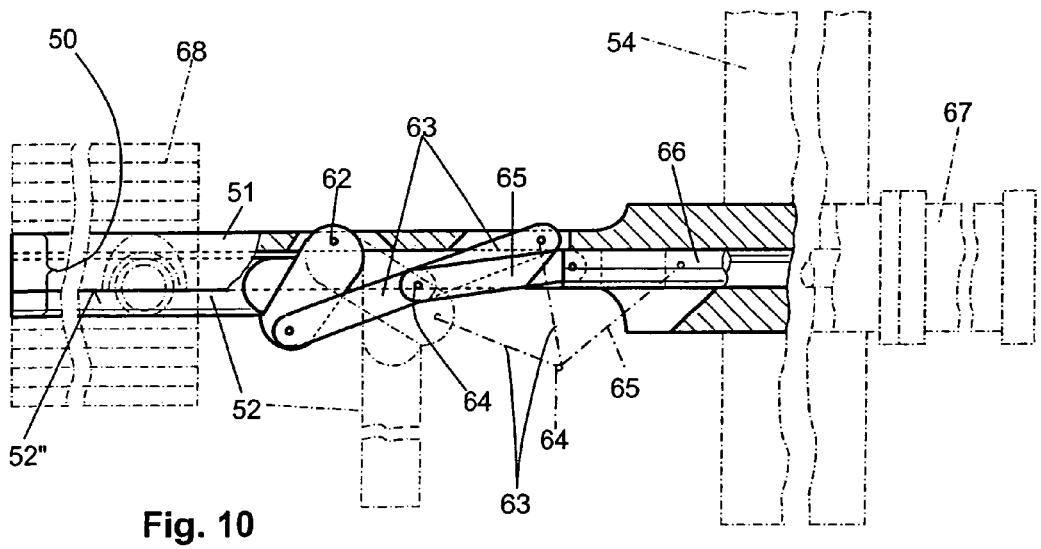
FIG. 10 shows an enlarged individual illustration of the long-nose pliers, which can be driven to rotate, for the already illustrated application tools with a lower jaw part which can be pivoted through 90° in order to grip and handle the pulling-off lug on the film composite and in order to wind up the protective strip.

The gripping tool, which has already been mentioned a number of times, is illustrated in various exemplary embodiments owing to its practical importance for the application technique. In the case of the exemplary embodiments which are illustrated in FIGS. 9 and 10 on the one hand and in FIGS. 11 and 12 on the other hand, the gripping tool is in each case in the form of long-nose pliers 50 and 50', which can rotate and are guided such that they can move, and which each have an upper jaw part (51 and 51', respectively) and a lower jaw part 52 and 52', respectively, which each have a constant cross section over their length extent. The upper jaw part 51 or 51', respectively, has a cross section in the form of a groove, with the two side edges together covering a contact plane 51" for the upper jaw part. The lower jaw part moves radially between these side edges while the long-nose pliers are being closed.

In the initial position, in which they are ready to pick up, the long-nose pliers 50 or 50' must be in such a circumferential position and the rotary drive must be equipped with an appropriately suitable control means for automatically moving it to this circumferential position, in which the upper jaw part 51 or 51', respectively, is arranged above the picking-up plane 21 while, in contrast, the lower jaw part 52, 52' is underneath the picking-up plane 21 when it is in the initial position in which it is ready to pick up.

In the general case, both the upper respective jaw part 51 or 51' and the lower jaw part 52, 52' of the long-nose pliers 50, 50' can move in the sense of an opening and closing movement.

Since the application tool approaches the film composite to be picked up from above, the upper jaw part 51 or 51', respectively, may be designed such that it does not move in the sense of an opening and closing movement of the long-nose pliers 50, 50'. In contrast, the lower jaw part 52, 52' must in this sense be arranged and guided such that it can move, and must be equipped with an appropriate movement drive. The difference between the two long-nose pliers is essentially firstly in the way in which they are fitted to the pulling-off lug 12 of the film composite to be picked up and how the coil 68 that is produced is subsequently released again, and on the other hand in the nature of the opening and closing movement of the long-nose pliers. In both of the exemplary embodiments of long-nose pliers, it must be possible to pivot to the abovementioned initial position of the long-nose pliers automatically by a suitable control means in the rotary drive 55 for the long-nose pliers.

In the exemplary embodiment of the long-nose pliers 50 which is illustrated in FIGS. 9 and 10, the lower jaw part 52 can be pivoted in the sense of an opening and closing movement of the long-nose pliers 50 through 90°, in such a way that, when in the initial position in which they are ready to pick up—with the long-nose pliers 50 entirely open—the lower jaw part 52 projects downwards at right angles to the picking-up plane 21 of the application tool 20". For this purpose, the lower jaw part is connected to the upper jaw part 51 via a pivoting bearing 62, whose pivoting axis is tangentially aligned with respect to the circumference of the long-nose pliers, and is arranged close to their circumference. A further pivoting bearing is fitted on the diametrically opposite side of the lower jaw part 52—offset axially towards the free end of the long-nose pliers with respect to the pivoting bearing 62—, is at a radial distance from the pivoting bearing 62, and thus forms an operating lever for the lower jaw part. A toggle lever linkage 63 has an approximately centrally located toggle link 64 which acts on the lower end of this operating lever, with the toggle lever linkage being articulated at its other end on the upper jaw part 51, at a point which is offset to the rear with respect to the pivoting bearing 62. A coupling element 65 acts on the toggle link 64, and can itself be operated via an operating plunger 66 by a linear movement cylinder 67. This on the one hand allows the lower jaw part 52 to be pivoted to the closed position, which is illustrated by solid lines, and on the other hand allows it to be pivoted to the open position, which is indicated by dashed-dotted lines, and in which the lower jaw part projects downward at right angles from the rotation axis of the long-nose pliers. The operating cylinder is provided at its exposed end with a pressure supply head, which is not illustrated in FIG. 10 but which allows pressure to be supplied from a fixed-position circumferential point to the rotating operating cylinder.

The advantage of the long-nose pliers 50 shown in FIG. 10 is that not just they themselves but also their operating drive are designed to be physically relatively simple and robust. However, this exemplary embodiment has the disadvantage that the lower jaw part projects well below the picking-up plane 21 while picking up a film composite, that is to say when the long-nose pliers are in the open state. The picking-up platform must therefore have a cutout at the location of the lower jaw part, which projects when open, or at least must be designed to be appropriately narrow at this point.

long-nose pliers 50' which are illustrated in an isolated form in FIGS. 11 and 12 and which could be installed in the application tool 20 or 20' instead of the long-nose pliers 50 will now be described in more detail. In this case as well, the upper jaw part 51' is once again arranged within the long-nose pliers such that it cannot move in the sense of opening and closing. In contrast, the lower jaw part 52'—and only this—can be moved toward the upper jaw part, parallel to it, in the sense of closing it, and can be moved back from it in the sense of opening it. Furthermore, the long-nose pliers as an entity can be moved out of and into the area of the film composite 5 to be picked up transversely with respect to its longitudinal direction, with the movement distance (transverse linear movement $H_q$) which can be covered by the long-nose pliers corresponding at least to the width of the film composite 5 to be picked up, or to the width of the pulling-off lug 12.

In addition to providing the gripping function for the pulling-off lug 12 for the film composite—as stated—the long-nose pliers 50' are also used as a coil core for the lower protective strip 9, and can accordingly be driven to rotate. For this purpose, the long-nose pliers are held on the freely accessible end of a spindle 71, which is itself mounted in a hollow shaft 70, which is mounted in the angled drive 54' such that it can rotate and can be driven to rotate, such that it cannot rotate but can move axially, by virtue of its external contour not being round. The axial movement of the long-nose pliers through the transverse linear movement $H_q$ takes place only in the open state, and during closure only in a rotation position of the long-nose pliers such that the upper and the lower jaw parts are respectively positioned above and below the film composite to be picked up, or the respective pulling-off lug 12 projecting from it. The long-nose pliers are not closed until the outer end of the transverse linear movement $H_q$ is reached, that is to say when the long-nose pliers have been moved over the entire width of the film composite; this situation is illustrated by solid lines in FIG. 11, and is indicated by dashed-dotted lines in FIG. 12. The opposite sequence occurs when the long-nose pliers are moved back, that is to say as soon as the long-nose pliers have been moved axially back from the outermost end position, they first of all return to the open position, before the return movement then starts to the pulled-back end position, which is illustrated by solid lines in FIG. 12.

An operating cylinder 77 is fitted to the axially opposite end of the spindle for axial movement of the spindle 71 and of the long-nose pliers 51', which operating cylinder 77 revolves with the spindle and must accordingly be provided with a pressure supply head 78, which is stationary in the rotation direction, for supplying pressure for the two operating directions of the rotating operating cylinder, as is indicated on the extreme right in the figure.

In the exemplary embodiment of the gripping tool illustrated in FIGS. 11 and 12, the closing movement and opening movement of the long-nose pliers is coupled to the linear movement drive for them in such a way that the movement for closing and opening the long-nose pliers is derived from the axial movement of the spindle 70. For this purpose, the lower jaw part 52' is fitted to a guide rod 72, which is guided such that it can move on a circular arc within the hollow spindle 71 by means of a pair of parallelogram guides 73, with the guide rod not only carrying out a radial movement in the sense of opening and closing the long-nose pliers, but also carrying out a short axial movement $h_a$ of the guide rod and of the lower jaw part 52' relative to the upper jaw part 51', which is rigidly connected to the spindle. The guide rod is stressed in the direction of the open position of the long-nose pliers by means of an opening spring 76 which is fitted to its rearward end. In order to use the axial movement of the spindle to derive a means for closing the long-nose pliers, the front area of the guide rod has arranged in it a transverse pin 74, which is guided such that it can move radially in it and projects through axially aligned elongated holes in the spindle as far as the reveal of the non-round internal hole in the hollow shaft 70. The end face of the hollow shaft is closed at the edge by a stop ring 75 which has axially projecting webs 75' which project into cutouts on the spindle, and in which case the stop ring 75 can interact with the transverse pin.

As soon as the transverse pin 74 strikes against the axially projecting web of the stop ring 75 towards the end of the transverse movement of the spindle 71, any further axial movement of the spindle results in the guide rod 72 being fixed, so that it carries out said axial movement $h_a$ relative to the spindle against the force of the opening spring 76, and in the process moves on the circular arc, which is defined by the pair of parallelogram guides, relative to the spindle, that is to say it also moves radially in it in the sense of a closing movement.

The long-nose pliers 50' shown in FIGS. 11 and 12 have the advantage over the long-nose pliers shown in FIG. 10 that, when they are in the state in which they are ready to pick up, they can without any problems be pulled completely back behind the picking-up plane 21, so that a film composite could be picked up by the associated application tool even from a relatively large, flat table surface.

Figure 13:
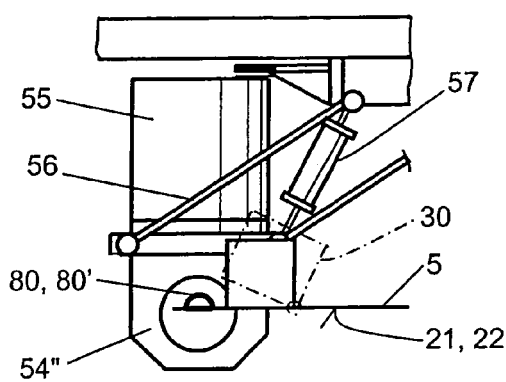
FIG. 13 shows a partial view of a further exemplary embodiment of an application tool, illustrating the protective film pulling-off apparatus, with the gripping tool which is driven such that it can rotate in this case being in the form of a suction strip which has a D-shaped cross section and at the same time acts as a coil core.
Figure 14A:
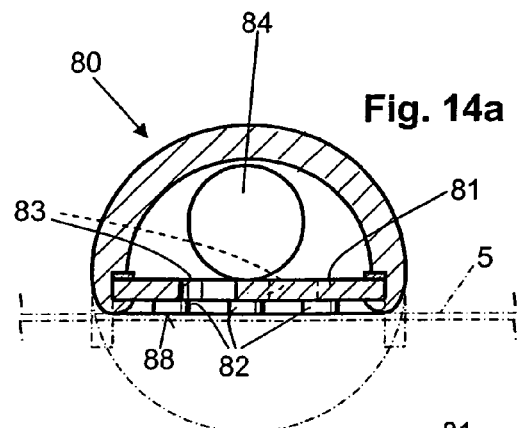
FIGS. 14a and 14b show a cross section (FIG. 14a) and a view of the open suction face (FIG. 14b) of the suction strip of the protective film pulling-off apparatus shown in FIG. 13, FIGS. 15a and 15b show a cross section (FIG. 15a) and a view of the open suction face (FIG. 15b) of a modified refinement of the suction strip, as could be used in the protective film pulling-off apparatus shown in FIG. 13, FIGS. 16a, b, c show three different exemplary embodiments of film composites with an intermediate supporting film in the end projections, and FIGS. 17a, b show two different exemplary embodiments of film composites without a supporting film in the end projections.
Figure 15A:
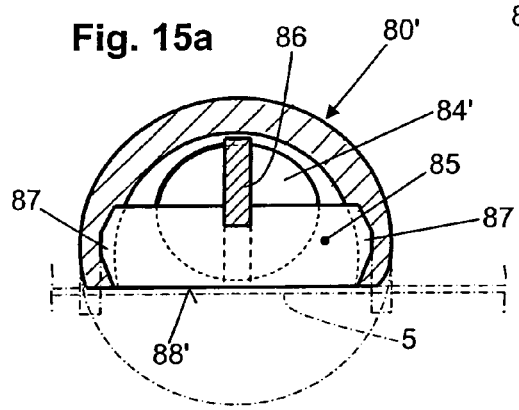
Figure 14B:
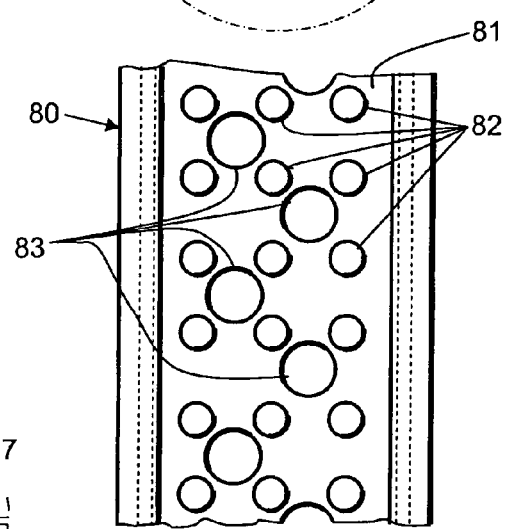
Figure 15B:
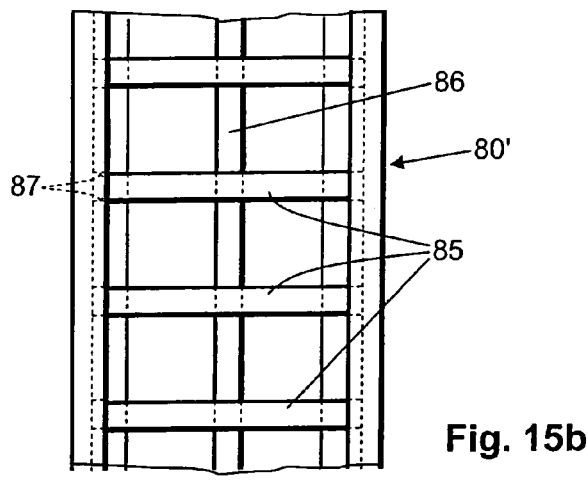

However, the disadvantage is that the drive is somewhat more complicated, because the long-nose pliers have to carry out not only a radial opening and closing movement, but also a relatively large transverse movement $H_q$ in order to fit the opened long-nose pliers at the side to the pulling-off lug of the film composite which has been picked up by the application tool.

gripping tools 80 and 80', respectively, which are in the form of suction strips, as shown in FIGS. 13-15 are considerably simpler, because they are integral and because the gripping function is produced pneumatically by means of a vacuum. FIG. 13 shows an overview drawing relating to the two exemplary embodiments of suction strips 80 and 80', respectively, which are shown in detail in FIGS. 14a, 14b and 15a, 15b, respectively. The gripping tool, which can move within the associated application tool, is likewise used as a coil core for the lower protective strip 9. It can accordingly be driven to rotate by means of the angled drive 54" and the drive motor 55, and has an approximately semicircular or D-shaped cross section. The suction strip, to which air or a vacuum can be applied in a controlled manner, has a sucking contact surface 88, 88' on its flat face. The interior of the output drive shaft of the angled drive 54" to which the suction strip is fitted is drilled such that it is hollow axially, with this hole being used as a vacuum supply. A pressure supply head, which does not rotate at the same time, is fitted to the rearward end of the output drive shaft, which projects out of the angled drive. The suction strip, which is used as a coil core, when it is in the state in which it is ready to pick up, must, of course, also be able to be deliberately moved to a rotation position such that the flat picking-up surface of the suction strip, which has a D-shaped cross section, is parallel to the picking-up plane of the application tool, or is parallel to the pulling-off lug of the film composite which has been picked up. A vacuum just has to be applied to the interior of the suction strips, which are fitted to the pulling-off lug, in order to grip the pulling-off lug 12 at the start-side projection of the film composite which is to be picked up or has already been picked up in the application tool.

The suction strips 80 and 80', respectively, which are illustrated in the FIGS. 14a, 14b and 15a, 15b, respectively, differ essentially in the physical configuration of the sucking picking-up surface 88 or 88', respectively, which can be fitted to the film composite 5. In the case of the exemplary embodiment of the suction strip 80 shown in FIGS. 14a, 14b, a studded metal sheet 81 is swaged in an airtight manner into the open end of an essentially semicircular tube. The studded metal sheet is provided with a large number of supporting studs 82 which are arranged in the form of a grid and are, for example, cylindrical, between which transfer openings 83 for the vacuum are fitted. The supporting studs form a very small contact and supporting surface towards the film composite 5 that has been picked up, so that the vacuum that is created can act on the film composite, and can hold the film composite firmly, over virtually the entire area of the studded metal sheet that is located between the side attachment flanges. A vacuum or air can be applied to the interior of the suction strip via a suction connection 84 which passes through the drive shaft of the gripping tool, which is used as the coil core.

The case of the suction strip 80' which is shown in FIGS. 15a, 15b is likewise based on an essentially semicircular tube, in whose open end here a grid is formed composed of laminates with, by way of example, a longitudinal web 86 and a large number of short transverse webs 85 which are incorporated in niches 87. The longitudinal faces of the half-tube which are swaged to the transverse webs are ground flush with the grid laminates in the area of the contact surface 88'. The vacuum can be supplied to the suction strip via a suction connection 84', which is likewise arranged in the shaft to which the rotating gripping tool is fitted. The advantage of the suction strip 80' shown in FIGS. 15a, 15b over the suction strip 80 is that it has a larger transfer cross section from the interior of the suction strip to the sucking surface. In the case of the suction strip 80' (FIGS. 15a, 15b), the transfer cross section on the one hand and the sucking area on the other hand are of equal size while, in contrast, there is a major difference in this respect between it and the suction strip 80 (FIGS. 14a, 14b).

The invention claimed is:

1. A method for automated application of self-adhesive film to bodywork parts, in which a film blank is gripped on the non-adhesive outer face at two opposite ends by means of suction grippers to which a vacuum can be applied, and is held stretched out, in which the film blank which is held stretched out is aligned accurately in position above the bodywork part to be bonded to and is adhesively bonded to it, comprising the steps:

providing prefabricated, elongated paint film blanks in a configuration according to features a to c) for application of paint film, and in that the paint film blanks which have been provided in this way are moved according to features d) to g) for automated application:

a) including each prefabricated, elongated paint film blank in a film composite and provided on the outside and underneath with an adherent but easily detachable protective strip, with each of the two protective strips projecting (projections) beyond a useful length (L) of the paint film blank at two ends, which are located in the area of the narrow faces of the paint film blank, b) approximately matching the length, measured in the longitudinal direction of the film blank, of an end projection to an attachment width ($b_2$) of the associated suction gripper measured in the longitudinal direction of the paint film blank while, in contrast, the length of a start-side projection is likewise matched approximately to the attachment width ($b_1$) of the associated suction gripper but with at least the lower protective strip on the start-side projection being lengthened by a specific gripping length beyond said attachment width ($b_1$), c) providing the film composite which includes the paint film blank is offered in a defined position with the outer protective strip being freely accessible in the working area of a freely programmable industrial robot, which is provided with an application tool, for picking up by the application tool, d) pushing up the film composite by two of said suction grippers, which are provided on the application tool and whose sucking picking-up surfaces are located on a standard picking-up plane, on the upper protective strip in the area of the end and start-side projections, with the two suction grippers then being pivoted from the picking-up plane through a respective specific angle ($\alpha$, $\alpha'$), in such a way that the projections which have been picked up off the film composite that is held stretched out, project obliquely and approximately in mirror-image form with respect to one another from a picking-up plane in the direction of a rear face of the application tool, e) pulling off the lower protective strip, starting from a start-side end of the paint film blank and guided by a start-side projection, which is used as a pulling-off lug and is gripped by a gripping tool, which can move within the application tool thus exposing the adhesive face of the paint film blank, f) once the film composite, which is held stretched out by the application tool has been aligned in the correct orientation at a short distance from the bodywork part, which is to be bonded to and is held firmly in the defined orientation and inflexibly, wiping the paint film blank onto the bodywork part to be bonded to, from the stretched-out separated position, by means of a flexible wiper which can move longitudinally within the application tool, g) pulling off the upper protective strip from the outer face of the applied paint film blank by means of a pulling-off movement of the the end suction gripper.

2. The method as claimed in claim 1, wherein the pivoting movement of the two suction grippers takes place in such a manner that the tensile stress in the picked-up film composite is changed no more than negligibly by the pivoting movement.

3. The method as claimed in claim 1, wherein a magnitude of a pivoting angle ($\alpha$, $\alpha'$) of the suction grippers is greater than the largest angle ($\beta$) which occurs during the application process between the film composite on the one hand and the connecting line between the two boundary edges, which are located on the picking-up plane), of the opposite suction grippers on the other hand.

4. The method as claimed in claim 1, wherein a supporting film which corresponds to the thickness of the paint film, is in each case inserted between the two protective strips in the area of the projections, so that the film composite is formed with three layers over its entire length—apart from certain interruptions—and has a uniform thickness (D) and in that the film composites are provided in a stacked form.

5. The method as claimed in claim 4, wherein the film composites are stacked at least in an approximately horizontal position.

6. The method as claimed in claim 1, wherein, at the start of the application process, the lower protective strip is pulled off only partially and the adhesive face of the paint film blank is initially only partially exposed, and in that the rest of the process of pulling off the lower protective strip and exposure of the adhesive face of the paint film blank are carried out corresponding to the progress of the process of wiping the paint film blank onto the bodywork part.

7. The method as claimed in claim 1, wherein the paint film blank is wiped onto the bodywork part in only a single direction and with only one wiper.

8. The method as claimed in claim 1, wherein, during the wiping on process, an approximately constant distance is maintained between the progressing wiper on the one hand and the likewise progressing pulling-off point on the lower protective strip that is to be pulled off.

9. The method as claimed in claim 1, wherein the process of pulling off the lower protective strip is carried out by the superimposition on the one hand of a translational movement of a winding device, which winds up the lower protective strip (9) and is moved at a speed which matches the speed of the wiper, and on the other hand by a winding movement of the winding device, with the winding device likewise winding up the pulled-off protective strip at a speed which matches the speed of the wiper.

10. The method as claimed in claim 1, wherein the end suction gripper approaches the bodywork surface to be bonded over towards the end of the wiping-on process.

11. The method as claimed in claim 1, wherein the end projection of the film composite which is gripped by the end suction gripper is allowed to continue sliding towards the end of the wiping-on process.

12. The method as claimed in claim 1, wherein the wiping-on process is carried out with a linear pressure of between 10 and 50 N/cm.

13. The method according to claim 12, wherein the linear pressure is between 20 and 30 N/cm.

14. The method as claimed in claim 1, wherein the paint film blank is wiped on by means of a wiper composed of a hard felt with a thickness of about 10 to 20 mm.

15. The method as claimed in claim 1, wherein, in order to pull the outer protective strip off the completely applied paint film blank, the application tool is pivoted away from the bodywork surface about a virtual pivoting axis which is at least one of located in the vicinity of one of the suction grippers, and is moved in the direction of the opposite end of the paint film blank such that the suction gripper which has been moved away pulls the outer protective strip off the applied paint film blank.

16. The method according to claim 15, wherein said one suction gripper is the start-side suction gripper.

* * * * *